United States Patent
Fukushima et al.

(10) Patent No.: US 11,414,518 B2
(45) Date of Patent: Aug. 16, 2022

(54) ROSIN-MODIFIED RESIN AND METHOD FOR PRODUCING SAME, VARNISH FOR ACTIVE ENERGY RAY-CURABLE LITHOGRAPHIC INK, ACTIVE ENERGY RAY-CURABLE LITHOGRAPHIC INK, AND PRINTED PRODUCT

(71) Applicants: TOYO INK SC HOLDINGS CO., LTD., Tokyo (JP); TOYO INK CO., LTD., Tokyo (JP)

(72) Inventors: Akeha Fukushima, Tokyo (JP); Mitsuhito Takamura, Tokyo (JP); Junya Suenaga, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 1001 days.

(21) Appl. No.: 16/087,089

(22) PCT Filed: Mar. 22, 2017

(86) PCT No.: PCT/JP2017/011500
§ 371 (c)(1),
(2) Date: Sep. 20, 2018

(87) PCT Pub. No.: WO2018/164246
PCT Pub. Date: Sep. 28, 2017

(65) Prior Publication Data
US 2021/0206913 A1    Jul. 8, 2021

(30) Foreign Application Priority Data

Mar. 22, 2016 (JP) .............................. JP2016-056629

(51) Int. Cl.
| | | |
|---|---|---|
| C08G 63/48 | (2006.01) | |
| C08F 283/01 | (2006.01) | |
| C09D 11/08 | (2006.01) | |
| C09D 11/101 | (2014.01) | |
| C09D 11/104 | (2014.01) | |

(52) U.S. Cl.
CPC ............ *C08G 63/48* (2013.01); *C08F 283/01* (2013.01); *C09D 11/08* (2013.01); *C09D 11/101* (2013.01); *C09D 11/104* (2013.01)

(58) Field of Classification Search
CPC ...... C09D 11/08; C09D 11/101; C08G 63/00; C08G 63/02; C08G 63/46; C08G 63/48
See application file for complete search history.

(56) References Cited

U.S. PATENT DOCUMENTS

| | | | | |
|---|---|---|---|---|
| 4,035,320 | A * | 7/1977 | Lawson | C09D 11/101 522/108 |
| 4,089,825 | A | 5/1978 | Lawson | |
| 5,093,463 | A | 3/1992 | Knox et al. | |
| 5,635,591 | A * | 6/1997 | Williams | C09D 11/10 530/211 |
| 2007/0179277 | A1* | 8/2007 | Dallavia | C08G 63/48 530/210 |
| 2019/0264044 | A1* | 8/2019 | Okawachi | C09D 11/037 |

FOREIGN PATENT DOCUMENTS

| | | |
|---|---|---|
| CN | 1880381 | 12/2006 |
| JP | S5281341 | 7/1977 |
| JP | S60226565 | 11/1985 |
| JP | H0251516 | 2/1990 |
| JP | H02145668 | 6/1990 |
| JP | 2001348516 | 12/2001 |
| JP | 2010070742 | 4/2010 |
| JP | 2010070743 | 4/2010 |
| JP | 2011225748 | 11/2011 |
| JP | 2013194121 | 9/2013 |

OTHER PUBLICATIONS

English language machine translation of JP 2010-070742 (Year: 2010).*
Office Action of China Counterpart Application, with English translation thereof, dated Jul. 30, 2020, pp. 1-17.
"Office Action of Japan Counterpart Application", dated Sep. 3, 2019, with English translation thereof, p. 1-p. 7.
"Search Report of Europe Counterpart Application," dated Feb. 27, 2019, p. 1-p. 7.
"Office Action of China Counterpart Application", dated Mar. 13, 2020, with English translation thereof, pp. 1-17.
"International Search Report (Form PCT/ISA/210)" of PCT/JP2017/011500, dated Jun. 20, 2017, with English translation thereof, pp. 1-4.
"Office Action of Japan Counterpart Application," dated Jan. 10, 2017, with English translation thereof, p. 1-p. 5.
"Office Action of Japan Counterpart Application," with machine English translation thereof, dated Jan. 7, 2020, p. 1-p. 5.
Office Action of China Counterpart Application, with English translation thereof, dated Feb. 5, 2021, pp. 1-14.

* cited by examiner

*Primary Examiner* — Megan McCulley
(74) *Attorney, Agent, or Firm* — JCIPRNET

(57) ABSTRACT

A rosin-modified resin having a structural unit (ab) derived from a compound obtained by addition of an α,β-unsaturated carboxylic acid or acid anhydride thereof (B) to a conjugated rosin acid (A), a structural unit (c) derived from an organic monobasic acid (C) excluding the conjugated rosin acid (A), a structural unit (d) derived from an aliphatic polybasic acid anhydride (D), and a structural unit (e) derived from a polyol (E), wherein the weight ratio between the structural unit (ab) and the structural unit (c) is within a range from 100:80 to 100:350.

11 Claims, No Drawings

ROSIN-MODIFIED RESIN AND METHOD FOR PRODUCING SAME, VARNISH FOR ACTIVE ENERGY RAY-CURABLE LITHOGRAPHIC INK, ACTIVE ENERGY RAY-CURABLE LITHOGRAPHIC INK, AND PRINTED PRODUCT

CROSS-REFERENCE TO RELATED APPLICATION

This application is a 371 of international application of PCT application serial no. PCT/JP2017/011500, filed on Mar. 22, 2017, which claims the priority benefit of Japan application no. 2016-056629, filed on Mar. 22, 2016. The entirety of each of the above-mentioned patent applications is hereby incorporated by reference herein and made a part of this specification.

TECHNICAL FIELD

The present invention relates to a rosin-modified resin and a method for producing the same, a varnish for an active energy ray-curable lithographic ink, an active energy ray-curable lithographic ink, and a printed product.

BACKGROUND ART

Inks used in lithographic printing typically have a comparatively high viscosity of 5 to 100 Pa·s. In the mechanism of a lithographic printing press, ink is supplied from an ink fountain of the printing press, passes through a plurality of rollers, and is supplied to the printing area of the printing plate to form a pattern, and the ink on the printing plate is then transferred to a substrate such as paper to form an image. In order to form the above pattern, in lithographic printing that uses dampening water, the dampening water is supplied to the non-printing area, so that the non-printing area repels the ink. On the other hand, in lithographic printing that does not use dampening water, a silicone layer is formed in the non-printing area, so that the non-printing area repels the ink.

Particularly in the case of lithographic printing that uses dampening water, the emulsification balance between the ink and the dampening water is very important. As a result, it is desirable that inks used in lithographic printing have suitable emulsification properties, as well as applicability to high-speed printing. If the amount of ink emulsification is too great, then inking of the non-printing area becomes increasingly likely, and smudges tend to occur more easily. On the other hand, if the amount of ink emulsification is too little, then when printing an image having little pattern, there is an increased chance of the dampening water squirting onto the inked surface. As a result, the ink transferability between rollers and the inking of the substrate tend to deteriorate, and performing stable printing becomes difficult.

Moreover, in recent years there have been growing demands for reduced staffing levels during printing, improved labor saving, automation, and increased printing speeds, and printing speeds in particular have become progressively faster. Accordingly, inks that can be used under various printing conditions to obtain high-quality printed products in a stable manner over long periods without any troubles are keenly sought, and various ink improvements have already been investigated.

On the other hand, active energy ray-curable inks contain an unsaturated compound such as an acrylic ester compound that exhibits curability upon irradiation with active energy rays as a component of the ink. Accordingly, when the ink is irradiated with active energy rays, the ink cures instantly, forming a tough coating film resulting from three dimensional crosslinking of the unsaturated compound. Further, because the ink cures instantly, post-processing can be performed immediately after printing. From these types of viewpoints, active energy ray-curable inks can be used very favorably in packaging printing and form printing and the like in commercial fields, which require a tough coating film in order to improve productivity and ensure good protection of the printed design.

Active energy ray-curable lithographic inks are generally composed of a binder resin, an active energy ray-curable compound such as an acrylic ester compound, a pigment, a radical polymerization initiator, and various additives.

An active energy ray-curable lithographic ink (hereafter sometimes referred to as simply "the ink") requires printability properties including favorable emulsification properties, scumming resistance, and initial density stability. Further, at the same time, the ink also requires printed coating film properties such as curability, glossiness and adhesiveness, as well as printed coating film strength such as abrasion resistance and solvent resistance. In order to satisfy these requirements, up until now, unsaturated polyester resins, epoxy acrylate resins, urethane acrylate resins, and polyester acrylate resins and the like have been investigated as potential active energy ray-curable binder resins.

For example, Patent Document 1 discloses a resin obtained by modifying an unsaturated polyester with an isocyanate group-containing urethane acrylate. However, because the disclosed resin has a structure of high linearity, obtaining adequate ink viscoelasticity is difficult, and printability properties such as misting and scumming resistance tend to deteriorate.

Further, Patent Document 2 discloses a resin obtained by reacting a polyester compound having excess hydroxyl groups and containing a rosin-derived polycarboxylic acid as an essential component with acrylic acid or methacrylic acid. However, the specification of the rosin-derived polycarboxylic acid is inadequate, and for example if the amount of residual conjugated double bonds is too great, then curing inhibition tends to be readily induced. As a result, the disclosed resin suffers from problems of curability, as well as unsatisfactory printed coating film strength.

Moreover, Patent Document 3 discloses a polyester resin containing a polycarboxylic acid, the resin obtained by an addition reaction between a rosin and an α,β-unsaturated carboxylic acid. However, the disclosed resin tends to suffer from unsatisfactory fluidity and glossiness.

In this manner, although various investigations have been conducted into active energy ray-curable binder resins, no resins exist which adequately satisfy the levels of printing properties and printed coating film properties required for an active energy ray-curable lithographic ink, and further improvements would be desirable.

PRIOR ART DOCUMENTS

Patent Documents

Patent Document 1: JP 2001-348516 A
Patent Document 2: JP H02-51516 A
Patent Document 3: JP 2010-070742 A

SUMMARY OF THE INVENTION

Problems Invention Aims to Solve

The present invention has been developed in light of these circumstances, and has an object of providing an active energy ray-curable lithographic ink that can achieve a combination of printed coating film applicability including curability, glossiness, adhesiveness, solvent resistance and abrasion resistance, and printability including initial density stability, as well as providing a printed product produced using the ink.

Means for Solution of the Problems

As a result of intensive investigations, the inventors of the present invention discovered that by using, as a binder resin, a rosin-modified resin, obtained by performing an addition reaction between a rosin acid and an α,β-unsaturated carboxylic acid or acid anhydride thereof, and then reacting the product with an organic monobasic acid, an aliphatic polybasic acid anhydride and a polyol, an active energy ray-curable lithographic ink capable of achieving a combination of excellent printability and excellent printed coated film applicability could be obtained, and they were therefore able to complete the present invention.

One aspect of the present invention relates to a rosin-modified resin. The rosin-modified resin has a structural unit (ab) derived from a compound obtained by addition of an α,β-unsaturated carboxylic acid or acid anhydride thereof (B) to a conjugated rosin acid (A), a structural unit (c) derived from an organic monobasic acid (C) excluding the conjugated rosin acid (A), a structural unit (d) derived from an aliphatic polybasic acid anhydride (D), and a structural unit (e) derived from a polyol (E), wherein the weight ratio between the structural unit (ab) and the structural unit (c) is within a range from 100:80 to 100:350.

In the above rosin-modified resin, the number of carbon atoms in the structural unit (d) is preferably not more than 16 (excluding the carbonyl carbon). Further, the proportion of the structural unit (d), based on the total number of moles of all the structural units that constitute the rosin-modified resin except for the structural unit (e), is preferably within a range from 5.0 mol % to 65.0 mol %.

Another aspect of the present invention relates to a rosin-modified resin obtained by reacting a compound obtained by addition of an α,β-unsaturated carboxylic acid or acid anhydride thereof (B) to a conjugated rosin acid (A), an organic monobasic acid (C) excluding the conjugated rosin acid (A) and an aliphatic polybasic acid anhydride (D), with a polyol (E), wherein the blend amount of the α,β-unsaturated carboxylic acid or acid anhydride thereof (B), relative to the conjugated rosin acid (A), is within a range from 80 mol % to 200 mol %, and the blend amount of the organic monobasic acid (C), relative to the conjugated rosin acid (A), is within a range from 100% by weight to 400% by weight.

In the above rosin-modified resin, the blend amount of the α,β-unsaturated carboxylic acid or acid anhydride thereof (B), relative to the conjugated rosin acid (A), is preferably within a range from 100 mol % to 200 mol %. Further, the blend amount of the organic monobasic acid (C), relative to the conjugated rosin acid (A), is preferably within a range from 150% by weight to 300% by weight. Furthermore, the number of carbon atoms in the aliphatic polybasic acid anhydride (D) is preferably not more than 16 (excluding the carbonyl carbon).

Another aspect of the present invention relates to a varnish for an active energy ray-curable lithographic ink containing the rosin-modified resin of the one aspect described above and an active energy ray-curable compound.

Another aspect of the present invention relates to an active energy ray-curable lithographic ink containing the rosin-modified resin of the one aspect described above, an active energy ray-curable compound, and a pigment.

Another aspect of the present invention relates to a printed product having a substrate, and a printed layer being formed on the substrate using the active energy ray-curable lithographic ink described above.

Another aspect of the present invention relates to a method for producing a rosin-modified resin, having a step of conducting a reaction of adding an α,β-unsaturated carboxylic acid or acid anhydride thereof (B) to a conjugated rosin acid (A), and a step of conducting an esterification reaction of the compound obtained in the above step, an organic monobasic acid (C) excluding the above conjugated rosin acid (A) and an aliphatic polybasic acid anhydride (D), with a polyol (E), wherein the blend amount of the α,β-unsaturated carboxylic acid or acid anhydride thereof (B), relative to the conjugated rosin acid (A), is within a range from 80 mol % to 200 mol %, and the blend amount of the organic monobasic acid (C), relative to the conjugated rosin acid (A), is within a range from 100% by weight to 400% by weight.

Effects of the Invention

By using the rosin-modified resin disclosed in the present description as a binder resin, an active energy ray-curable lithographic ink can be provided that can achieve a combination of printability and printed coating film applicability. By using this ink, high-quality printed products can be obtained efficiently with a low number of waste sheets, even when printing is performed under conventional lithographic printing conditions.

The disclosure of the present description is related to the subject matter disclosed in prior Japanese Application 2016-056629 filed on Mar. 22, 2016, the entire contents of which are incorporated by reference herein.

EMBODIMENTS FOR CARRYING OUT THE INVENTION

Embodiments of the present invention are described below in detail. However, the present invention is not limited to the embodiments disclosed below, and various modifications are possible without departing from the scope of the present invention.

A rosin-modified resin according to an embodiment of the present invention has a structural unit (ab) derived from a compound obtained by addition of an α,β-unsaturated carboxylic acid or acid anhydride thereof (B) to a conjugated rosin acid (A), a structural unit (c) derived from an organic monobasic acid (C) excluding the conjugated rosin acid (A), a structural unit (d) derived from an aliphatic polybasic acid anhydride (D), and a structural unit (e) derived from a polyol (E), wherein the weight ratio between the structural unit (ab) and the structural unit (c) is within a range from 100:80 to 100:350.

In one embodiment, the above weight ratio (ab):(c) is preferably from 100:100 to 100:310, more preferably from 100:100 to 100:250, and even more preferably from 100:110 to 100:230. In the rosin-modified resin, when the above weight ratio (ab):(c) falls within the above range, imparting the coating film with glossiness is easier. Further, obtaining a resin having a favorable molecular weight distribution is easier, meaning it is easier to improve the solvent resistance and abrasion resistance.

The above weight ratio (ab):(c) is the ratio between the weights of all the structural units (ab) and all the structural units (c) in the rosin-modified resin, and means the value for the weight of the structural units (c) in the rosin-modified resin when the weight of the structural units (ab) in the rosin-modified resin is deemed to be 100.

The weight of the structural units (ab) and the weight of the structural units (c) are calculated by subtracting the residual amounts of each of the monomers following completion of the reaction from the amounts of the above monomers (A), (B) and (C) used in the production of the rosin-modified resin. Specific examples of the calculation method are described in detail in the Examples.

In one embodiment, the rosin-modified resin is a polymer compound obtained by reaction of a compound obtained by addition of the α,β-unsaturated carboxylic acid or acid anhydride thereof (B) to the conjugated rosin acid (A), the organic monobasic acid (C) excluding the conjugated rosin acid (A) and the aliphatic polybasic acid anhydride (D), with the polyol (E). The polymer compound is a rosin-modified polyester resin (hereafter referred to as a "rosin-modified resin") having a structure in which the structural units (ab), (c) and (d) derived from the various monomers and the structural unit (e) are mutually bonded together via ester linkages. This rosin-modified resin may also have a structural unit (a) derived from the conjugated rosin acid (A) and/or a structural unit (b) derived from the α,β-unsaturated carboxylic acid or acid anhydride thereof (B).

Although not a particular limitation, in those cases when, for example, a compound having two carboxyl groups such as maleic acid (anhydride) is used as the α,β-unsaturated carboxylic acid or acid anhydride thereof (B), and a compound having two carboxyl groups such as succinic anhydride is used as the aliphatic polybasic acid anhydride (D), the rosin-modified resin may typically have partial structures represented by formulas (I) to (VI) shown below. Among these, the partial structures represented by formulas (IV) to (VI) below are specific examples of resin terminal structures. However, the partial structures of the rosin-modified resin are not limited to these structures shown below.

Further, although described below in further detail, in those cases where the α,β-unsaturated carboxylic acid or acid anhydride thereof (B) participates in the reaction as the aliphatic polybasic acid anhydride (D), the formulas (I), (II) and (IV) shown below may contain a structural unit (b) derived from the α,β-unsaturated carboxylic acid or acid anhydride thereof (B) instead of the structural unit (d). Further, in those cases where residual component (A) exists following the addition reaction of the component (B) to the component (A) (the Diels-Alder addition reaction described below), a portion of the structural unit (c) may be replaced with the structural unit (a) derived from the component (A). (Examples of Rosin-Modified Resin Partial Structures)

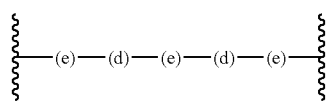
(I)

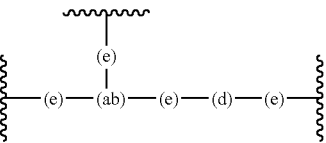
(II)

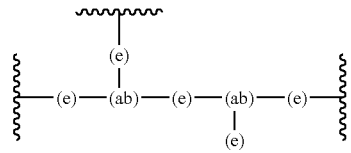
(III)

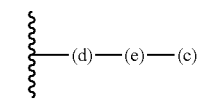
(IV)

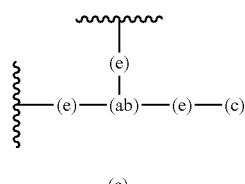
(V)

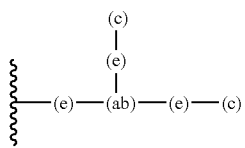
(VI)

The monomers that constitute each of the structural units are described below.

<Conjugated Rosin Acid (A)>

The compound having the structural unit (ab) that constitutes part of the rosin-modified resin is formed by a Diels-Alder addition reaction of the conjugated rosin acid (A) and the α,β-unsaturated carboxylic acid or acid anhydride thereof (B).

The conjugated rosin acid (A) is a rosin acid having conjugated double bonds. In this description, a "rosin acid" means an organic monobasic acid having a cyclic diterpene skeleton, or a derivative thereof. The rosin acid may be a rosin acid, a disproportionated rosin acid, a hydrogenated rosin acid, or an alkali metal salt of one of these compounds. Further, the term "conjugated double bonds" means a bonding sequence in which a plurality of double bonds are linked in an alternating sequence with single bonds sandwiched therebetween. However, this term excludes the conjugated double bonds of π-electron conjugated systems incorporated within aromatic compounds. In other words, the "conjugated rosin acid (A)" described in the present description means the type of rosin acid described above, and excludes hydrogenated rosin acids and the like that do not have conjugated double bonds.

Specific examples of the conjugated rosin acid (A) include abietic acid, and conjugated compounds thereof such as neoabietic acid, palustric acid and levopimaric acid. Furthermore, examples of natural resins containing these types of conjugated rosin acids (A) include gum rosin, wood rosin and tall oil rosin. These natural resins generally contain a conjugated rosin acid (A) together with rosin acids that do not have conjugated double bonds, but these natural resins may still be used during the production of the rosin-modified resin. The rosin acids that do not have conjugated double bonds participate in the reaction as the organic monobasic acid (C) described below. Further, depending on the blend amount used during production of the rosin-modified resin, the conjugated rosin acid (A) may also form the structural unit (a) derived from the compound.

<α,β-Unsaturated Carboxylic Acid or Acid Anhydride Thereof (B)>

Specific examples of the α,β-unsaturated carboxylic acids or acid anhydrides thereof (B) that can be used to obtain the compound having the structural unit (ab) that constitutes part of the rosin-modified resin include acrylic acid, methacrylic acid, maleic acid, fumaric acid, citraconic acid, itaconic acid, crotonic acid, isocrotonic acid, cinnamic acid, 2,4-hexadienoic acid, and the acid anhydrides of these acids.

From the viewpoint of the reactivity with the conjugated rosin acid (A), maleic acid and the acid anhydride thereof are preferred. Depending on the blend amount used during production of the rosin-modified resin, the α,β-unsaturated carboxylic acid or acid anhydride thereof (B) may also form the structural unit (b) derived from this compound.

<Organic Monobasic Acid (C)>

Examples of organic monobasic acids (C) that can be used to obtain the structural unit (c) that constitutes part of the rosin-modified resin include any organic monobasic acid that does not have conjugated double bonds, and known materials may be used as desired. Specific examples include:

saturated fatty acids such as acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, heptadecylic acid, stearic acid, nonadecanoic acid, arachic acid and behenic acid;

unsaturated fatty acids such as crotonic acid, linderic acid, tsuzuic acid, myristoleic acid, palmitoleic acid, undecylenic acid, oleic acid, elaidic acid, gadoleic acid, gondoic acid, setoleic acid, erucic acid, brassidic acid, linoelaidic acid, linolenic acid and arachidonic acid;

aromatic monobasic acids such as benzoic acid, methylbenzoic acid, tertiary-butylbenzoic acid, naphthoic acid, and ortho-benzoylbenzoic acid; and compounds having conjugated double bonds but not having a cyclic diterpene skeleton, such as conjugated linoleic acid, eleostearic acid, parinaric acid and calendic acid.

Furthermore, as mentioned above, rosin acids that do not have conjugated double bonds, such as pimaric acid, isopimaric acid, sandaracopimaric acid and dehydroabietic acid may also be used as the organic monobasic acid (C).

In one embodiment, from the viewpoint of improving the compatibility with the active energy ray-curable compound, enabling an improvement in the fluidity, a compound having not more than 16 carbon atoms is preferably used as the organic monobasic acid (C). This number of carbon atoms means the number of carbon atoms excluding the carbon atom of the carbonyl group in the compound. Further, from the viewpoint of improving the compatibility with the pigment, enabling an improvement in the glossiness, the use of an aromatic monobasic acid from among the compounds listed above is particularly preferred.

<Aliphatic Polybasic Acid Anhydride (D)>

The aliphatic polybasic acid anhydride (D) means a polybasic acid anhydride that excludes aromatic polybasic acid anhydrides. The aliphatic polybasic acid anhydride (D) may have either a linear structure or a branched structure. Further, a so-called alicyclic polybasic acid anhydride having a cyclic structure may also be used.

Specific examples of aliphatic polybasic acid anhydrides (D) that can be used to obtain the structural unit (d) that constitutes part of the rosin-modified resin include anhydrides of oxalic acid, malonic acid, succinic acid, glutaric acid, pimelic acid, sebacic acid, azelaic acid, alkyl succinic acids such as dodecylsuccinic acid, tetradecylsuccinic acid and pentadecylsuccinic acid, 1,2,3,6-tetrahydrophthalic acid, 3-methyl-1,2,3,6-tetrahydrophthalic acid, 4-methyl-1,2,3,6-tetrahydrophthalic acid, hexahydrophthalic acid, 3-methylhexahydrophthalic acid, 4-methylhexahydrophthalic acid, himic acid, 3-methylhimic acid and 4-methylhimic acid.

Dibasic acid anhydrides listed above as examples of the α,β-unsaturated carboxylic acid or acid anhydride thereof (B) may also be used as the aliphatic polybasic acid anhydride (D). Specifically, acid anhydrides of maleic acid, fumaric acid, citraconic acid and itaconic acid may be used.

In the rosin-modified resin of the present embodiment, including structural units derived from the aliphatic polybasic acid anhydride rather than structural units derived from an aromatic polybasic acid anhydride that maintains a rigid structure enables the resin to exhibit improved adhesiveness.

In one embodiment, the proportion of the structural unit (d) in the rosin-modified resin, based on the total number of moles of all the structural units except for the structural unit (e) described below, is preferably at least 5.0 mol %, more preferably at least 6.5 mol %, and even more preferably 8.0 mol % or greater. On the other hand, the proportion of the structural unit (d) is preferably not more than 65.0 mol %, more preferably not more than 55.0 mol %, even more preferably not more than 45.0 mol %, and particularly preferably 38.5 mol % or less. In one embodiment, the proportion of the structural unit (d) is preferably within a range from 5.0 to 65.0 mol %, more preferably within a range from 6.5 to 45.0 mol %, and even more preferably within a range from 8.0 to 38.5 mol %.

During the production of the rosin-modified resin, in those cases where an excess of the α,β-unsaturated carboxylic acid or acid anhydride thereof (B) is used relative to the conjugated rosin acid (A), the rosin-modified resin will contain the structural unit (b) as a result of an esterification reaction between the polyol (E) and the component (B). In such an embodiment, in the case where, for example, a dibasic acid anhydride such as maleic anhydride is used as the α,β-unsaturated carboxylic acid or acid anhydride thereof (B), the excess dibasic acid anhydride participates in the reaction as a portion of the aliphatic polybasic acid anhydride (D). In other words, in this type of embodiment, the proportion of the structural unit (d) in the rosin-modified resin includes the structural unit (b) derived from the excess component (B).

In the present description, the proportion (mol %) of each structural unit in the rosin-modified resin is calculated in the same manner as that described above for the weight ratio between structural units, by subtracting the residual amount of the monomer following completion of the reaction from the amount of the monomer corresponding with the structural unit used in the production of the rosin-modified resin.

From the viewpoints of improving the compatibility with the active energy ray-curable compound, improving the fluidity, and enhancing the glossiness and printability, the number of carbon atoms in the structural unit (d) is preferably not more than 16 (excluding the carbonyl carbon). From these types of viewpoints, a compound having not more than 16 carbon atoms (excluding the carbonyl carbon) is preferably used as the aliphatic polybasic acid anhydride (D). In one embodiment, at least one compound selected from the group consisting of succinic anhydride, 1,2,3,6- tetrahydrophthalic anhydride and tetradecylsuccinic anhydride is preferably used as the aliphatic polybasic acid anhydride (D).

<Polyol (E)>

Examples of polyols (E) that can be used to obtain the structural unit (e) that constitutes part of the rosin-modified resin include any compound having two or more hydroxyl groups within the molecule, and there are no particular limitations. The polyol (E) reacts with the carboxylic acids in the compound obtained from the Diels-Alder reaction between the conjugated rosin acid (A) and the α,β-unsaturated carboxylic acid or acid anhydride thereof (B), the organic monobasic acid (C) and the aliphatic polybasic acid anhydride (D) to form ester linkages.

In one embodiment, the polyol (E) may be a dihydric alcohol. Although not a particular limitation, specific examples of the dihydric alcohol are listed below.

(Linear Alkylene Dihydric Alcohols)

1,2-ethanediol, 1,2-propanediol, 1,3-propanediol, 1,2-butanediol, 1,4-butanediol, 1,2-pentanediol, 1,5-pentanediol, 1,6-hexanediol, 1,2-hexanediol, 1,5-hexanediol, 2,5-hexanediol, 1,7-heptanediol, 1,8-octanediol, 1,2-octanediol, 1,9-nonanediol, 1,2-decanediol, 1,10-decanediol, 1,12-dodecanediol, 1,2-dodecanediol, 1,14-tetradecanediol, 1,2-tetradecanediol, 1,16-hexadecanediol, and 1,2-hexadecanediol and the like.

(Branched Alkylene Dihydric Alcohols)

2-methyl-2,4-pentanediol, 3-methyl-1,5-pentanediol, 2-methyl-2-propyl-1,3-propanediol, 2,4-dimethyl-2,4-pentanediol, 2,2-dimethyl-1,3-propanediol, 2,2,4-trimethyl-1,3-pentanediol, dimethyloloctane, 2-ethyl-1,3-hexanediol, 2,5-dimethyl-2,5-hexanediol, 2-methyl-1,8-octanediol, 2-butyl-2-ethyl-1,3-propanediol, and 2,4-diethyl-1,5-pentanediol and the like.

(Cyclic Alkylene Dihydric Alcohols)

1,2-cyclohexanediol, 1,4-cyclohexanediol, 1,4-cyclohexanedimethanol, 1,2-cycloheptanediol, tricyclodecanedimethanol, hydrogenated bisphenol A, hydrogenated bisphenol F, hydrogenated bisphenol S, hydrogenated catechol, hydrogenated resorcin, and hydrogenated hydroquinone and the like.

Other specific examples include polyether polyols such as polyethylene glycol (n=2 to 20), polypropylene glycol (n=2 to 20) and polytetramethylene glycol (n=2 to 20), and polyester polyols.

In another embodiment, the polyol (E) may be a trihydric or higher polyhydric alcohol. Specific examples include linear, branched and cyclic polyhydric alcohols such as glycerol, trimethylolpropane, pentaerythritol, 1,2,6-hexanetriol, 3-methylpentane-1,3,5-triol, hydroxymethylhexanediol, trimethyloctane, diglycerol, ditrimethylolpropane, dipentaerythritol, sorbitol, inositol and tripentaerythritol.

In one embodiment, the rosin-modified resin is a compound obtained by reaction of the compound obtained by addition of the α,β-unsaturated carboxylic acid or acid anhydride thereof (B) to the conjugated rosin acid (A), the organic monobasic acid (C) excluding the conjugated rosin acid (A) and the aliphatic polybasic acid anhydride (D), with the polyol (E), wherein the blend amount of the α,β-unsaturated carboxylic acid or acid anhydride thereof (B) relative to the conjugated rosin acid (A) is from 80 to 200 mol %, and the blend amount of the organic monobasic acid (C) relative to the conjugated rosin acid (A) is from 100 to 400% by weight.

<Method for Producing Rosin-Modified Resin>

The rosin-modified resin is produced by (1) reaction of the conjugated rosin acid (A) and the α,β-unsaturated carboxylic acid or acid anhydride thereof (B), and (2) reaction of the carboxylic acid-containing compounds including the compound obtained in the reaction of (1), the organic monobasic acid (C) and the aliphatic polybasic acid anhydride (D), with the polyol (E).

The above reaction (1) is a Diels-Alder addition reaction of a conjugated double bond (diene) in the conjugated rosin acid (A) and a double bond (dienophile) in the α,β-unsaturated carboxylic acid or acid anhydride thereof (B). Further, the above reaction (2) is an esterification between carboxyl groups in the compounds including the Diels-Alder addition reaction product obtained in the reaction (1), the organic monobasic acid (C) and the aliphatic polybasic acid anhydride (D), and hydroxyl groups in the polyol (E).

The Diels-Alder addition reaction between the conjugated rosin acid (A) and the α,β-unsaturated carboxylic acid or acid anhydride thereof (B) yields a polyvalent carboxylic acid compound. Accordingly, subsequent esterification with the polyol (E) enables an increase in the molecular weight. Further, by also involving the organic monobasic acid (C) during the esterification reaction, any excessive increase in the molecular weight can be suppressed, and the molecular weight distribution can be controlled. Moreover, the Diels-Alder addition reaction can eliminate the conjugated double bonds in the conjugated rosin acid (A), and can also introduce polycyclic structures derived from the rosin acid into the rosin-modified resin. Typically, the conjugated double bonds within the conjugated rosin acid (A) tend to cause curing inhibition during the active energy ray irradiation used for the purpose of ink curing. However, in the present embodiment, because the conjugated double bonds in the conjugated rosin acid (A) are eliminated by the Diels-Alder addition reaction, improving the curability of the ink becomes a simple task.

As described above, by using the method for producing a rosin-modified resin according to an embodiment of the present invention, a combination of favorable printability properties such as emulsification properties, high-speed printability and curability, and coating film strength can be achieved. As mentioned above, by incorporating the aliphatic polybasic acid anhydride (D) which has flexibility into the structure, in addition to the coating film properties mentioned above, excellent adhesiveness and glossiness can also be achieved.

There are no particular limitations on the conditions for the Diels-Alder addition reaction, and the reaction may be performed in accordance with normal methods. The reaction temperature may be determined with due consideration of the boiling points and reactivity of the compounds being used. In one embodiment, the reaction temperature is preferably within a range from 80 to 200° C., more preferably within a range from 100 to 200° C., and even more preferably within a range from 100 to 180° C.

The Diels-Alder addition reaction may be performed in the presence of a polymerization inhibitor. Specific examples of polymerization inhibitors that may be used include hydroquinone, p-methoxyphenol, methylhydroquinone, methoxyhydroquinone, 2,6-di-t-butylphenol, 2,6-di-t-butyl-4-hydroxytoluene, t-butylcatechol, 4-methoxy-1-naphthol and phenothiazine.

There are also no particular limitations on the conditions for the esterification reaction, and the reaction may be performed in accordance with normal methods. The reaction temperature may be determined with due consideration of the boiling points and reactivity of the compounds being used. In one embodiment, the reaction temperature is preferably within a range from 200 to 300° C., more preferably within a range from 200 to 280° C., and even more preferably within a range from 200 to 260° C.

Further, if necessary, a catalyst can be used in the esterification reaction. Examples of catalysts that can be used include organic sulfonic acids such as benzenesulfonic acid, p-toluenesulfonic acid, p-dodecylbenzenesulfonic acid, methanesulfonic acid and ethanesulfonic acid, mineral acids such as sulfuric acid and hydrochloric acid, as well as trifluoromethylsulfuric acid and trifluoromethylacetic acid. Other examples of catalysts that can be used include metal complexes such as tetrabutyl zirconate and tetraisobutyl titanate, and metal salt catalysts such as magnesium oxide, magnesium hydroxide, magnesium acetate, calcium oxide, calcium hydroxide, calcium acetate, zinc oxide and zinc acetate. These catalysts are typically used in an amount within a range from 0.01 to 5% by weight based on the total weight of all of the components used during the production of the rosin-modified resin. In order to suppress the resin coloration that occurs due to the use of a catalyst, hypophosphoric acid, triphenyl phosphite, triphenyl phosphate or triphenylphosphine or the like may also be used in combination with the catalyst during resin production.

In the production of the rosin-modified resin, the monomers (A) to (E) that constitute the resin may be blended simultaneously, or blended in a stepwise manner.

For example, a mixture of the conjugated rosin acid (A), the $\alpha,\beta$-unsaturated carboxylic acid or acid anhydride thereof (B), the organic monobasic acid (C), the aliphatic polybasic acid anhydride (D) and the polyol (E) may be used to conduct the reaction in a two-step process. In this case, the reaction temperature is first set a temperature that allows the Diels-Alder addition reaction between the conjugated rosin acid (A) and the $\alpha,\beta$-unsaturated carboxylic acid or acid anhydride thereof (B) to proceed. More specifically, initially the reaction temperature is controlled at a temperature that allows the Diels-Alder addition reaction to proceed, and after holding that temperature for a prescribed period of time, the reaction mixture is then heated to a temperature that enables the esterification reaction to proceed.

In another method, the conjugated rosin acid (A) and the $\alpha,\beta$-unsaturated carboxylic acid or acid anhydride thereof (B) are first combined, and following completion of the Diels-Alder addition reaction, the organic monobasic acid (C), the aliphatic polybasic acid anhydride (D) and the polyol (E) are added, and the esterification reaction is performed.

In one embodiment, in the case where an excess of the $\alpha,\beta$-unsaturated carboxylic acid or acid anhydride thereof (B) is used relative to the conjugated rosin acid (A), the portion of the component (B) that does not participate in the Diels-Alder addition reaction is consumed in the subsequent esterification reaction in a similar manner to the aliphatic polybasic acid anhydride (D). The same compound as the $\alpha,\beta$-unsaturated carboxylic acid or acid anhydride thereof (B) may be used as the aliphatic polybasic acid anhydride (D).

In one embodiment, the blend amount of the $\alpha,\beta$-unsaturated carboxylic acid or acid anhydride thereof (B), relative to the conjugated rosin acid (A), is preferably within a range from 80 to 200 mol %, more preferably within a range from 100 to 200 mol %, and even more preferably within a range from 110 to 200 mol %. When the blend amount of the $\alpha,\beta$-unsaturated carboxylic acid or acid anhydride thereof (B) is adjusted to a value within the above range, obtaining a rosin-modified resin having excellent curability and fluidity is easier.

In one embodiment, the blend amount of the organic monobasic acid (C), relative to the conjugated rosin acid (A), is preferably within a range from 100 to 400% by weight, more preferably within a range from 100 to 300% by weight, and even more preferably within a range from 150 to 300% by weight. When this blend amount is at least 100% by weight, gelling during the resin synthesis can be more easily suppressed. Further, when the blend amount is not more than 400% by weight, the weight average molecular weight of the rosin-modified resin can be more easily controlled. Further, when an active energy ray-curable lithographic ink is produced using a rosin-modified resin that has been obtained with the above blend amount set as described above, the fluidity of the ink improves, and superior glossiness and printability can be more easily achieved.

In one embodiment, the method for producing the rosin-modified resin includes:

a first step of conducting an addition reaction of an $\alpha,\beta$-unsaturated carboxylic acid or acid anhydride thereof (B) to a conjugated rosin acid (A), and a second step of conducting a reaction of the compound obtained in the first step, an organic monobasic acid (C) excluding the above conjugated rosin acid (A) and an aliphatic polybasic acid anhydride (D), with a polyol (E), wherein the blend amount of the $\alpha,\beta$-unsaturated carboxylic acid or acid anhydride thereof (B), relative to the conjugated rosin acid (A), is within a range from 80 to 200 mol %, and the blend amount of the organic monobasic acid (C), relative to the conjugated rosin acid (A), is within a range from 100 to 400% by weight.

In the production method described above, the first step is preferably performed at a reaction temperature within a range from 80° C. to 200° C. Further, the second step is preferably performed at a reaction temperature within a range from 200° C. to 300° C.

In the rosin-modified resin, in those cases where the amount of structural units containing a polycyclic structure derived from the rosin acid is at least 10% by weight, properties such as improved emulsification properties and coating film strength derived from those polycyclic structures manifest favorably, which is desirable. Further, when the amount of structural units containing a polycyclic structure is not more than 40% by weight, the solubility in the active energy ray-curable compound during preparation of a varnish or ink composition tends to be more favorable, which is also desirable.

In one embodiment, in those cases where a natural resin such as a gum rosin is used as a raw material in the production of the rosin-modified resin, the natural resin also contains other components such as rosin acids that do not have conjugated double bonds in addition to the conjugated rosin acid (A). In this type of embodiment, the blend amount of the natural resin is preferably adjusted so that the total amount of components within the natural resin that have a polycyclic structure derived from a rosin acid falls within the above range, regardless of whether those components have, or do not have, conjugated double bonds.

The rosin-modified resin has a polystyrene-equivalent weight average molecular weight, measured by gel permeation chromatography (GPC), that is preferably within a range from 10,000 to 50,000, more preferably within a range from 15,000 to 45,000, even more preferably within a range from 15,000 to 35,000, and particularly preferably within a range from 15,000 to 30,000. When the weight average molecular weight of the rosin-modified resin falls within the above range, an ink that uses the resin has favorable emulsification properties and excellent printability.

The acid value of the rosin-modified resin is preferably within a range from 5 to 50, more preferably within a range from 5 to 45, even more preferably within a range from 15 to 40, and particularly preferably within a range from 20 to 38. When the acid value of the rosin-modified resin falls within the above range, an ink that uses the resin has favorable emulsification properties and excellent printability.

In the rosin-modified resin, the hydroxyl group/carboxyl group ratio is preferably within a range from 0.8 to 1.2, more preferably within a range from 0.9 to 1.2, and even more preferably within a range from 1.0 to 1.2. Further, the melting point of the rosin-modified resin is preferably at least 50° C., more preferably within a range from 60 to 100° C., and even more preferably within a range from 60 to 80° C.

Although not a particular limitation, in one embodiment, the rosin-modified resin preferably has a polystyrene-equivalent weight average molecular weight from 15,000 to 35,000, an acid value from 15 to 40, and a melting point of at least 60° C. When an active energy ray-curable lithographic ink is produced using a rosin-modified resin for which each of these properties falls within the respective range above, excellent emulsification properties and ink transferability can be more easily obtained. The melting point can be measured using a Melting Point M-565 apparatus manufactured by BUCHI AG, under conditions including a rate of temperature increase of 0.5° C./minute.

<Varnish for Active Energy Ray-Curable Lithographic Ink>

In one embodiment, the rosin-modified resin described above can be used to produce a varnish for an active energy ray-curable lithographic ink. In one embodiment, the varnish for an active energy ray-curable lithographic ink may contain the rosin-modified resin described above and an active energy ray-curable compound. Although not a particular limitation, the varnish for an active energy ray-curable lithographic ink may contain from 10 to 50% by weight of the rosin-modified resin and from 50 to 90% by weight of the active energy ray-curable compound, based on the total weight of the varnish. The blend ratio between the rosin-modified resin and the active energy ray-curable compound, expressed as a weight ratio, is more preferably within a range from 10:90 to 45:55, and even more preferably within a range from 20:80 to 45:55.

In the present description, an active energy ray-curable compound means a compound having an acrylic group within the molecule. Specific examples of compounds that may be used to produce the above varnish for an active energy ray-curable lithographic ink include:

monofunctional active energy ray-curable compounds such as 2-ethylhexyl acrylate, methoxy diethylene glycol acrylate and acryloylmorpholine, difunctional active energy ray-curable compounds such as ethylene glycol diacrylate, polyethylene glycol diacrylate (n=2 to 20), propylene glycol diacrylate, polypropylene glycol diacrylate (n=2 to 20), alkane (4 to 12 carbon atoms) glycol diacrylate, alkane (4 to 12 carbon atoms) glycol ethylene oxide adduct (2 to 20 mol) diacrylate, alkane (4 to 12 carbon atoms) glycol propylene oxide adduct (2 to 20 mol) diacrylate, hydroxypivalyl hydroxypivalate diacrylate, tricyclodecane dimethylol diacrylate, bisphenol A ethylene oxide adduct (2 to 20 mol) diacrylate, hydrogenated bisphenol A diacrylate, and hydrogenated bisphenol A ethylene oxide adduct (2 to 20 mol) diacrylate, trifunctional active energy ray-curable compounds such as glycerol triacrylate, glycerol ethylene oxide adduct (3 to 30 mol) triacrylate, glycerol propylene oxide adduct (3 to 30 mol) triacrylate, trimethylolpropane triacrylate, trimethylolpropane ethylene oxide adduct (3 to 30 mol) triacrylate, and trimethylolpropane propylene oxide adduct (3 to 30 mol) triacrylate, tetrafunctional active energy ray-curable compounds such as pentaerythritol tetraacrylate, pentaerythritol ethylene oxide adduct (4 to 40 mol) tetraacrylate, pentaerythritol propylene oxide adduct (4 to 40 mol) tetraacrylate, diglycerol tetraacrylate, diglycerol ethylene oxide adduct (4 to 40 mol) tetraacrylate, diglycerol propylene oxide adduct (4 to 40 mol) tetraacrylate, ditrimethylolpropane tetraacrylate, ditrimethylolpropane ethylene oxide adduct (4 to 40 mol) tetraacrylate, and ditrimethylolpropane propylene oxide adduct (4 to 40 mol) tetraacrylate, and polyfunctional active energy ray-curable compounds such as dipentaerythritol hexaacrylate, dipentaerythritol ethylene oxide adduct (6 to 60 mol) hexaacrylate, and dipentaerythritol propylene oxide adduct (6 to 60 mol) hexaacrylate.

The above compounds may be used alone as the active energy ray-curable compound, or a combination of two or more compounds may be used.

Among the compounds listed above, from the viewpoint of curability, the use of a polyfunctional active energy ray-curable compound is preferred. The polyfunctional active energy ray-curable compound is preferably one or more compounds selected from the group consisting of pentaerythritol tetraacrylate, pentaerythritol ethylene oxide adduct (4 to 40 mol) tetraacrylate, pentaerythritol propylene oxide adduct (4 to 40 mol) tetraacrylate, diglycerol tetraacrylate, diglycerol ethylene oxide adduct (4 to 40 mol) tetraacrylate, diglycerol propylene oxide adduct (4 to 40 mol) tetraacrylate, ditrimethylolpropane tetraacrylate, ditrimethylolpropane ethylene oxide adduct (4 to 40 mol) tetraacrylate, ditrimethylolpropane propylene oxide adduct (4 to 40 mol) tetraacrylate, dipentaerythritol hexaacrylate, dipentaerythritol ethylene oxide adduct (6 to 60 mol) hexaacrylate, and dipentaerythritol propylene oxide adduct (6 to 60 mol) hexaacrylate.

The active energy ray-curable compound may be selected appropriately in accordance with the cured coating film properties that are required. If necessary, an oligomer such as a polyester acrylate, polyurethane acrylate or epoxy acrylate may be used in combination with the above compound.

In one embodiment, the varnish for an active energy ray-curable lithographic ink may also contain a photopolymerization inhibitor in addition to the above components. In this type of embodiment, the photopolymerization inhibitor may be added and used via typical methods. In those cases where a photopolymerization inhibitor is added to the varnish, from the viewpoint of not inhibiting the curability, the blend amount of the photopolymerization inhibitor is preferably not more than 3% by weight based on the total weight of the varnish for an active energy ray-curable lithographic ink. In one embodiment, the photopolymerization inhibitor is preferably used in an amount within a range from 0.01 to 1% by weight based on the total weight of the varnish.

Specific examples of photopolymerization inhibitors that can be used include (alkyl)phenol, hydroquinone, catechol, resorcin, p-methoxyphenol, t-butylcatechol, t-butylhydroquinone, pyrogallol, 1,1-picrylhydrazine, phenothiazine, p-benzoquinone, nitrosobenzene, 2,5-di-tert-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene)aniline oxide, dibutylcresol, cyclohexanone oxime cresol, guaiacol, o-isopropylphenol, butyraldoxime, methyl ethyl ketoxime, and cyclohexanone oxime. Although not a particular limitation, in one embodiment, the use of one or more compounds selected from the group consisting of hydroquinone, p-methoxyphenol, t-butylhydroquinone, p-benzoquinone and 2,5-di-tert-butyl-p-benzoquinone is preferred.

The varnish for an active energy ray-curable lithographic ink can be produced, for example, by mixing the above components under temperature conditions within a range from normal temperature to 150° C. In one embodiment, a varnish obtained by heating and melting the rosin-modified resin, dipentaerythritol hexaacrylate and hydroquinone under temperature conditions of 100° C. can be used favorably.

<Active Energy Ray-Curable Lithographic Ink>

In one embodiment, an energy ray-curable lithographic ink can be produced using the rosin-modified resin described above. For example, the active energy ray-curable lithographic ink may contain the rosin-modified resin, an active energy ray-curable compound, and a pigment. The active energy ray-curable may be the same as the compound described above as a varnish component.

In one embodiment, the active energy ray-curable lithographic ink may contain 5 to 40% by weight of the rosin-modified resin, 30 to 75% by weight of the active energy ray-curable, and 5 to 40% by weight of the pigment (provided that the total of all the components is 100% by weight). The rosin-modified resin and the active energy ray-curable compound may be used in the form of a varnish that has been prepared in advance.

The pigment may be any conventionally known pigment, and both inorganic pigments and organic pigments may be used.

Specific examples of the inorganic pigments include chrome yellow, zinc yellow, Prussian blue, barium sulfate, cadmium red, titanium oxide, zinc white, red iron oxide, alumina white, calcium carbonate, ultramarine blue, carbon black, graphite and aluminum powder.

Specific examples of the organic pigments include soluble azo pigments such as β-naphthol-based pigments, β-oxynaphthoic acid-based pigments, β-oxynaphthoic acid anilide-based pigments, acetoacetic acid anilide-based pigments and pyrazolone-based pigments, insoluble azo pigments such as β-naphthol-based pigments, β-oxynaphthoic acid anilide-based pigments, acetoacetic acid anilide-based monoazo pigments, acetoacetic acid anilide-based disazo pigments, and pyrazolone-based pigments, phthalocyanine-based pigments such as copper phthalocyanine blue, halogenated (chlorinated or brominated) copper phthalocyanine blue, sulfonated copper phthalocyanine blue and metal-free phthalocyanine, and polycyclic pigments and heterocyclic pigments such as quinacridone-based pigments, dioxazine-based pigments, threne-based pigments (such as pyranthrone, anthanthrone, indanthrone, anthrapyrimidine, flavanthrone, thioindigo-based pigments, anthraquinone-based pigments, perinone-based pigments and perylene-based pigments), isoindolinone-based pigments, metal complex-based pigments and quinophthalone-based pigments. Any conventionally known pigment may be used.

The active energy ray-curable lithographic ink cures upon irradiation with active energy rays. In one embodiment, when the ink is cured by ultraviolet rays, a photopolymerization initiator is preferably added to the ink. Photopolymerization initiators can be generally classified into two types, namely a type in which the active species is generated as a result of intramolecular bond cleavage upon irradiation, and a type in which the active species is generated by initiating a hydrogen abstraction reaction between molecules.

Examples of the former type include acetophenone-based initiators such as 2-benzyl-2-dimethylamino-1-(4-morpholinophenyl)-butanone-1, diethoxyacetophenone, 4-(2-hydroxyethoxy)phenyl (2-hydroxy-2-propyl) ketone, 2-methyl-2-morpholino(4-thiomethylphenyl)propan-1-one, 2-hydroxy-2-methyl-1-phenylpropan-1-one, 1-hydroxycyclohexyl phenyl ketone, [4-(2-hydroxyethoxy)-phenyl]-2-hydroxy-2-methyl-1-propan-1-one, benzyl dimethyl ketal, oligo {2-hydroxy-2-methyl-1-[4-(1-methylvinyl)phenyl]propane} and 4-(2-acryloyloxyethoxy)phenyl 2-hydroxy-2-propyl ketone, benzoin-based initiators such as benzoin, benzoin isopropyl ether and benzoin isobutyl ether, a mixture of 1-hydroxycyclohexyl phenyl ketone and benzophenone, acylphosphine oxide-based initiators such as 2,4,6-trimethylbenzoyl diphenylphosphine oxide and bis(2,4,6-trimethylbenzoyl)-phenylphosphine oxide, as well as benzil, methyl phenyl glyoxy ester and 3,3',4,4'-tetra(t-butylperoxycarbonyl)benzophenone.

Examples of the latter type include benzophenone-type initiators such as benzophenone, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyObenzophenone and 3,3'-dimethyl-4-methoxybenzophenone, thioxanthone-based initiators such as 2-isopropylthioxanthone, 2,4-dimethylthioxanthone, 2,4-diethylthioxanthone and 2,4-dichlorothioxanthone, aminobenzophenones such as Mithler's ketone and 4,4'-bisdiethylaminobenzophenone, as well as 10-butyl-2-chloroacridone, 2-ethylanthraquinone, 9,10-phenanthrenequinone, and camphorquinone.

The photopolymerization initiators listed above may be used alone, or if necessary a combination of two or more initiators may be used.

In those cases where the active energy ray-curable lithographic ink is cured by irradiating the ink with ultraviolet rays, simply adding a photopolymerization initiator to the ink is sufficient, but in order to further improve the curability, a photosensitizer may also be used in combination with the photopolymerization initiator.

Examples of the photosensitizer include amines such as triethanolamine, methyl di ethanol amine, dimethylethanolamine, triisopropanolamine, methyl 4-dimethylaminobenzoate, ethyl 4-dimethylaminobenzoate, isoamyl 4-dimethylaminobenzoate, (2-dimethylamino)ethyl benzoate, (n-butoxy)ethyl 4-dimethylaminobenzoate, and 2-ethylhexyl 4-dimethylaminobenzoate.

In one embodiment, in those cases where ultraviolet rays are used as the active energy rays, the blend amount of the photopolymerization initiator is preferably from 0.01 to 15% by weight, and more preferably from 0.05 to 10% by weight, based on the total weight of the active energy ray-curable lithographic ink. When the above blend amount is at least 0.01% by weight, the curing reaction proceeds satisfactorily. Further, when the blend amount is not more than 15% by weight, the occurrence of thermal polymerization reactions can be suppressed, and the stability of the active energy ray-curable lithographic ink can be more easily maintained in a favorable state. In those cases where ionizing radiation other than ultraviolet rays is used for the active energy rays, a photopolymerization initiator need not be added.

The active energy ray-curable lithographic ink may also contain various additives such as photopolymerization inhibitors, abrasion resistance agents, blocking inhibitors and slipping agents depending on the intended purpose. These additives can be added to the ink using typical methods. When adding any of the various additives to the ink, the blend amount of the additive is preferably adjusted so as not to impair the effects of the other ink materials. In one embodiment, the blend amount of each of the various additives is preferably not more than 15% by weight, based on the total weight of the active energy ray-curable lithographic ink. In those cases where a photopolymerization inhibitor is used, the same compounds as those mentioned above as the photopolymerization inhibitor for the varnish for an active energy ray-curable lithographic ink may be used.

Irradiation of the active energy rays is preferably performed in an inert gas atmosphere of nitrogen gas or the like, but irradiation may also be performed in the open atmosphere. Using an infrared heater or the like to heat the applied layer of the active energy ray-curable lithographic ink prior to irradiation with the active energy rays, or using an infrared heater or the like to heat the cured layer of the active energy ray-curable lithographic ink following irradiation with the active energy rays is effective in accelerating completion of the curing process.

In the present description, the term "active energy rays" means ionizing radiation typified by ultraviolet rays, electron beams, X-rays, α-rays, β-rays and γ-rays, as well as microwaves and high-frequency waves and the like. However, the active energy rays are not limited to the above examples, and any energy source capable of generating radical active species may be used, including visible light rays, infrared rays and laser light rays.

Examples of sources for generating ultraviolet rays include LEDs, ultra high pressure mercury lamps, high pressure mercury lamps, medium pressure mercury lamps, low pressure mercury lamps, metal halide lamps, xenon lamps, carbon arc lamps, helium-cadmium lasers, YAG lasers, excimer lasers and argon lasers.

The active energy ray-curable lithographic ink can be produced by kneading and mixing the above components under temperature conditions within a range from normal temperature to 100° C. When producing the ink, the use of any of various devices such as a kneader, triple roll mill, attritor, sand mill or gate mixer is preferred. When the rosin-modified resin is added to produce the ink, the rosin-modified resin may be added as is, or may be added in the form of a varnish for an active energy ray-curable lithographic ink that contains the rosin-modified resin.

In one embodiment, the active energy ray-curable lithographic ink can typically be used favorably in lithographic offset printing using dampening water. However, the ink is not limited to this type of embodiment, and can also be used favorably in waterless lithographic printing that does not use dampening water.

In one embodiment, the active energy ray-curable lithographic ink may be applied to printed products such as form printed products, printed products for all manner of books and publications, printed products for various forms of packaging such as cartons, various plastic printed products, printed products for stickers and labels, fine art printed products, and metal printed products (including fine art printed products, printed drinking cans, and printed food items such as canned food). In another embodiment, the active energy ray-curable lithographic ink may be used as an overcoat varnish for the above types of printed products.

There are no particular limitations on the substrates to which the ink may be applied. Specific examples of substrates that can be used include uncoated papers such as high-quality papers, coated papers including finely coated papers, coated papers, lightweight coated papers and cast coated papers, paperboard such as white paperboard and cardboard, as well as synthetic papers, aluminum-deposited paper, and plastic sheets of polypropylene, polyethylene, polyethylene terephthalate and polyvinyl chloride and the like.

EXAMPLES

The present invention is described below in further detail using a series of examples, but the present invention is in no way limited by these examples. In the present description, "parts" indicates parts by weight, and "%" indicates % by weight.

Details regarding the various measurements performed in the following examples are as follows.

(Weight Average Molecular Weight)

The weight average molecular weight was measured using a gel permeation chromatograph (HLC-8320) manufactured by Tosoh Corporation. A calibration curve was prepared using standard polystyrene samples. Further, tetrahydrofuran was used as the eluent, and three TSKgel Super HM-M columns (manufactured by Tosoh Corporation) were used as the columns. Measurement was performed under conditions including a flow rate of 0.6 mL/minute, an injection volume of 10 μL, and a column temperature of 40° C.

(Acid Value)

The acid value was measured by a neutralization titration method. Specifically, first, 1 g of the rosin-modified resin was dissolved in 20 mL of a solvent prepared by mixing xylene and ethanol in a weight ratio of 2:1. Subsequently, 3 mL of a 3% by weight solution of phenolphthalein was added as an indicator to the prepared solution of the rosin-modified resin, and a neutralization titration was performed with a 0.1 mol/L ethanolic solution of potassium hydroxide. The units for the acid value are mgKOH/g.

(Rosin Acid Component Analysis)

The rosin acid used as a raw material was analyzed by gas chromatography-mass spectrometry, and the surface area ratio (%) of each peak was determined relative to a value of 100% for the total peak surface area for the entire rosin acid. More specifically, the ratio between the conjugated rosin acid (A) and the organic monobasic acid (C) contained in the rosin acid was determined from the ratio between the surface areas of the corresponding peaks.

(Confirmation of Progression of Diels-Alder Addition Reaction, and Quantification of Produced Addition Reaction Product)

The reaction solution from the Diels-Alder addition reaction was analyzed by gas chromatography-mass spectrometry, and the progress of the reaction was confirmed by the decrease in the detection peaks for the conjugated rosin acid (A) and the α,β-unsaturated carboxylic acid or acid anhydride thereof (B) used as raw materials. When no further decrease in the detection peaks was observed, the reaction was halted.

Further, calibration curves were created in advance for the conjugated rosin acid (A) contained in the rosin acid and the α,β-unsaturated carboxylic acid or acid anhydride thereof (B), and the residual amount of each component left in the reaction solution was measured by fitting the peak surface area obtained in the above analysis to the prepared calibration curve at reaction completion. By then subtracting the residual amount of each component from the amount of that component used in the reaction, the amounts of the components (A) and (B) consumed in the Diels-Alder addition reaction were calculated. Moreover, by then adding these amounts of the components consumed in the Diels-Alder addition reaction, the weight of the compound having the structural unit (ab) obtained in the above addition reaction by adding the α,β-unsaturated carboxylic acid or acid anhydride thereof (B) to the conjugated rosin acid (A) was able to be calculated.

The molar quantity of the compound having the structural unit (ab) obtained by adding the α,β-unsaturated carboxylic acid or acid anhydride thereof (B) to the conjugated rosin acid (A) was deemed to be the smaller of the two molar quantities of the components consumed in the Diels-Alder reaction, each of which was calculated by dividing the previously calculated weight of the component (A) or component (B) consumed in the Diels-Alder addition reaction by the molecular weight of that component.

Furthermore, the molecular weight of the compound having the structural unit (ab) obtained in the Diels-Alder addition reaction can be calculated as the sum of the molecular weight of the component (A) and the molecular weight of the component (B).

(Confirmation of Amount of Each Structural Unit in Rosin-Modified Resin)

In a similar manner to the quantification of the above compound having the structural unit (ab) (the Diels-Alder addition reaction product), the reaction solution obtained following the esterification reaction was analyzed by gas chromatography-mass spectrometry, and the peak surface areas for the organic monobasic acid (C), the aliphatic polybasic acid anhydride (D) and the polyol (E) were measured. By fitting these amounts to previously created calibration curves for each of these components, the residual amount of each component left in the reaction solution was measured. By then subtracting the residual amount of each component from the amount of that component used in the esterification reaction, the amounts of the various components consumed in the esterification reaction, namely the weights of the structural units (c), (d) and (e) that exist in the rosin-modified resin, were able to be calculated.

Furthermore, for the residual components (A) and (B) that did not participate in the Diels-Alder addition reaction, a similar method to that described above was used to measure the residual amount of each component in the reaction solution obtained following the esterification reaction. By subtracting the residual amount of each component from the residual amount of the corresponding component (A) or (B) left in the reaction solution following the Diels-Alder addition reaction, the amounts of these components consumed in the esterification reaction, namely the weights of the structural units (a) and (b) that exist in the rosin-modified resin, were able to be calculated.

Moreover, for the compound having the structural unit (ab) obtained by adding the α,β-unsaturated carboxylic acid or acid anhydride thereof (B) to the conjugated rosin acid (A), a similar method to that described above was used to measure the amount of the residual component in the reaction solution following the esterification reaction. By subtracting this residual amount from the previously calculated weight of the compound having the structural unit (ab) obtained as a result of the Diels-Alder addition reaction, the amount of the component consumed in the esterification reaction, namely the weight of the structural unit (ab) that exist in the rosin-modified resin, was able to be calculated.

Then, by dividing the amount of each component consumed in the esterification reaction by the molecular weight of that component, the molar quantities for the various components consumed in the esterification reaction, namely the molar quantity of the structural unit (ab), and the molar quantity of each of the structural units (a), (b), (c), (d) and (e) derived from the various components (monomers), were calculated for the rosin-modified resin obtained following the esterification reaction.

In the examples and comparative examples described below, maleic anhydride was used as the α,β-unsaturated carboxylic acid or acid anhydride thereof (B). Accordingly, in those cases where residual component (B) remained after the Diels-Alder addition reaction, the weight or molar quantity of the structural unit (d) in the rosin-modified resin is the total of the amount of the aliphatic polybasic acid anhydride (D) consumed, and the amount of the structural unit (b) within the rosin-modified resin derived from the excess component (B).

1. Preparation of Rosin-Modified Resins and Active Energy Ray-Curable Lithographic Ink Compositions Rosin-modified resins and active energy ray-curable lithographic ink compositions were prepared in accordance with the formulations of the examples and comparative examples described below. The gum rosin used in the following formulations had a conjugated rosin acid (A) content of 80% by weight and an organic monobasic acid (C) content of 20% by weight.

Example 1

A four-neck flask fitted with a stirrer, a reflux condenser fitted with a water separator, and a thermometer was charged with 10 parts of the gum rosin and 5 parts of maleic anhydride, and by heating the contents to 180° C. over a period of one hour while the flask was flushed with nitrogen gas, a reaction mixture was obtained. Next, as described above, gas chromatography-mass spectrometry of the reaction mixture was used to confirm the completion point of the Diels-Alder addition reaction.

Subsequently, 16 parts of benzoic acid, 41 parts of 1,2,3,6-tetrahydrophthalic anhydride, 28 parts of pentaerythritol, and 0.1 parts of p-toluenesulfonic acid monohydrate as a catalyst were added to the above reaction mixture, and a dehydration condensation reaction was conducted at 230° C. over a period of 14 hours, thus obtaining a resin (R1). The acid value of the resin (R1) was 31, and the polystyrene-equivalent weight average molecular weight (Mw) measured by GPC was 28,000. The proportions of the various structural units in the resin (R1), calculated in accordance with the methods described above, were as shown in Table 1.

Next, a similar flask to that described above was charged with 38 parts of the above resin (R1), 61.9 parts of dipentaerythritol hexaacrylate and 0.1 parts of hydroquinone, and following mixing of the components, the components were heated and melted at 100° C. to obtain a varnish (V1).

Subsequently, 62 parts of the varnish (V1), 20 parts of LIONOL BLUE FG-7330 (an indigo pigment manufactured by TOYOCOLOR Co., Ltd.), 12.9 parts of trimethylolpropane tetraacrylate, 2.5 parts of 4,4'-bis(diethylamino)benzophenone, 2.5 parts of 2-methyl-2-morpholino(4-thiomethylphenyl)propan-1-one, and 0.1 parts of hydroquinone were kneaded at 40° C. in a triple roll mill to obtain a mixture. Subsequently, sufficient trimethylolpropane tetraacrylate was added to the mixture to adjust the ink tack to a value from 9 to 10, thus obtaining an active energy ray-curable lithographic ink (C1). The ink tack was measured using an inkometer manufactured by Toyo Seiki Kogyo Co., Ltd., under conditions including a roller temperature of 30° C. and 400 rpm, and refers to the value measured one minute after printing.

Example 2

Using the same procedure as Example 1 and the blend formulation shown Table 1, a resin (R2) having an acid value of 25 and a Mw of 20,000 was obtained. The proportions of the various structural units in the resin (R2), calculated in accordance with the methods described above, were as shown in Table 1. Subsequently, a varnish (V2) was obtained using the blend formulation shown in Table 2, and an active energy ray-curable lithographic ink (C2) was obtained using the blend formulation shown in Table 3.

Example 3

Using the same procedure as Example 1 and the blend formulation shown Table 1, a resin (R3) having an acid value of 23 and a Mw of 22,000 was obtained. The proportions of the various structural units in the resin (R3), calculated in accordance with the methods described above, were as shown in Table 1. Subsequently, a varnish (V3) was obtained using the blend formulation shown in Table 2, and an active energy ray-curable lithographic ink (C3) was obtained using the blend formulation shown in Table 3.

Example 4

Using the same procedure as Example 1 and the blend formulation shown Table 1, a resin (R4) having an acid value of 29 and a Mw of 23,000 was obtained. The proportions of the various structural units in the resin (R4), calculated in accordance with the methods described above, were as shown in Table 1. Subsequently, a varnish (V4) was obtained using the blend formulation shown in Table 2, and an active energy ray-curable lithographic ink (C4) was obtained using the blend formulation shown in Table 3.

Example 5

A four-neck flask fitted with a stirrer, a reflux condenser fitted with a water separator, and a thermometer was charged with 30 parts of the gum rosin, 9 parts of maleic anhydride, 30 parts of benzoic acid, 2 parts of succinic anhydride, 29 parts of 2,2-dimethyl-1,3-propanediol and 0.1 parts of p-toluenesulfonic acid monohydrate, and the resulting mixture was heated at 180° C. for one hour while the flask was flushed with nitrogen gas. Subsequently, the thus obtained reaction mixture was subjected to a dehydration condensation reaction at 230° C. for 12 hours, thus obtaining a resin (R5). The acid value of the resin (R5) was 33, and the polystyrene-equivalent weight average molecular weight (Mw) measured by GPC was 25,000. The proportions of the various structural units in the resin (R5), calculated in accordance with the methods described above, were as shown in Table 1.

Next, a similar flask to that described above was charged with 34 parts of the above resin (R5), 65.9 parts of dipentaerythritol hexaacrylate and 0.1 parts of hydroquinone, and following mixing of the components, the components were heated and melted at 100° C. to obtain a varnish (V5).

Subsequently, 62 parts of the varnish (V5), 20 parts of LIONOL BLUE FG-7330 (an indigo pigment manufactured by TOYOCOLOR Co., Ltd.), 12.9 parts of trimethylolpropane tetraacrylate, 2.5 parts of 4,4'-bis(diethylamino)benzophenone, 2.5 parts of 2-methyl-2-morpholino(4-thiomethylphenyl)propan-1-one, and 0.1 parts of hydroquinone were kneaded at 40° C. in a triple roll mill to obtain a mixture. Subsequently, sufficient trimethylolpropane tetraacrylate was added to the mixture to adjust the ink tack to a value from 9 to 10, thus obtaining an active energy ray-curable lithographic ink (C5). The ink tack was measured using an inkometer manufactured by Toyo Seiki Kogyo Co., Ltd. under conditions including a roller temperature of 30° C. and 400 rpm, and refers to the value measured one minute after printing.

Example 6

Using the same procedure as Example 1 and the blend formulation shown Table 1, a resin (R6) having an acid value of 20 and a Mw of 18,000 was obtained. The proportions of the various structural units in the resin (R6), calculated in accordance with the methods described above, were as shown in Table 1. Subsequently, a varnish (V6) was obtained using the blend formulation shown in Table 2, and an active energy ray-curable lithographic ink (C6) was obtained using the blend formulation shown in Table 3.

Example 7

Using the same procedure as Example 1 and the blend formulation shown Table 1, a resin (R7) having an acid value of 36 and a Mw of 29,000 was obtained. The proportions of the various structural units in the resin (R7), calculated in accordance with the methods described above, were as shown in Table 1. Subsequently, a varnish (V7) was obtained using the blend formulation shown in Table 2, and an active energy ray-curable lithographic ink (C7) was obtained using the blend formulation shown in Table 3.

Example 8

Using the same procedure as Example 1 and the blend formulation shown Table 1, a resin (R8) having an acid value of 33 and a Mw of 23,000 was obtained. The proportions of the various structural units in the resin (R8), calculated in accordance with the methods described above, were as shown in Table 1. Subsequently, a varnish (V8) was obtained using the blend formulation shown in Table 2, and an active energy ray-curable lithographic ink (C8) was obtained using the blend formulation shown in Table 3.

Example 9

A four-neck flask fitted with a stirrer, a reflux condenser fitted with a water separator, and a thermometer was charged with 15 parts of the gum rosin and 20 parts of maleic anhydride, and the contents were heated to 180° C. while the flask was flushed with nitrogen gas.

Subsequently, 30 parts of tertiary-butylbenzoic acid, 9 parts of 1,2,3,6-tetrahydrophthalic anhydride, 26 parts of pentaerythritol, and 0.1 parts of p-toluenesulfonic acid monohydrate were added, and a dehydration condensation reaction was conducted at 230° C. over a period of 18 hours, thus obtaining a resin (R9). The acid value of the resin (R9) was 22, and the polystyrene-equivalent weight average molecular weight (Mw) measured by GPC was 30,000. The proportions of the various structural units in the resin (R9), calculated in accordance with the methods described above, were as shown in Table 1.

Next, a similar flask was charged with 33 parts of the resin (R9), 66.9 parts of dipentaerythritol hexaacrylate and 0.1 parts of hydroquinone, and following mixing of the components, the components were heated and melted at 100° C. to obtain a varnish (V9).

Subsequently, 61 parts of the varnish (V9), 20 parts of LIONOL BLUE FG-7330 (an indigo pigment manufactured by TOYOCOLOR Co., Ltd.), 13.9 parts of trimethylolpropane tetraacrylate, 2.5 parts of 4,4'-bis(diethylamino)benzophenone, 2.5 parts of 2-methyl-2-morpholino(4-thiomethylphenyl)propan-1-one, and 0.1 parts of hydroquinone were kneaded at 40° C. in a triple roll mill, and sufficient trimethylolpropane tetraacrylate was then added to the mixture to adjust the ink tack to a value from 9 to 10, thus obtaining an active energy ray-curable lithographic ink (C9). The ink tack was measured using an inkometer manufactured by Toyo Seiki Kogyo Co., Ltd. under conditions including a roller temperature of 30° C. and 400 rpm, and refers to the value measured one minute after printing.

Comparative Example A

Using the same procedure as Example 9 and the blend formulation shown Table 1, a resin (RA) having an acid value of 25 and a Mw of 25,000 was obtained. The proportions of the various structural units in the resin (RA), calculated in accordance with the methods described above, were as shown in Table 1. Subsequently, a varnish (VA) was obtained using the blend formulation shown in Table 2, and an active energy ray-curable lithographic ink (CA) was obtained using the blend formulation shown in Table 3.

Comparative Example B

A four-neck flask fitted with a stirrer, a reflux condenser fitted with a water separator, and a thermometer was charged with 41 parts of benzoic acid, 6 parts of succinic anhydride, 22 parts of pentaerythritol and 0.1 parts of p-toluenesulfonic acid monohydrate were added, and a dehydration condensation reaction was conducted at 230° C. over a period of 5 hours while the flask was flushed with nitrogen gas.

Then, 25 parts of the gum rosin and 6 parts of maleic anhydride were added, and the mixture was heated to 230° C., thus obtaining a resin (RB) having an acid value of 37, and a polystyrene-equivalent weight average molecular weight (Mw) measured by GPC of 25,000. The proportions of the various structural units in the resin (RB), calculated in accordance with the methods described above, were as shown in Table 1.

Next, a similar flask was charged with 34 parts of the resin (RB), 65.9 parts of dipentaerythritol hexaacrylate and 0.1 parts of hydroquinone, and following mixing of the components, the components were heated and melted at 100° C. to obtain a varnish (VB).

Subsequently, 61 parts of the varnish (VB), 20 parts of LIONOL BLUE FG-7330 (an indigo pigment manufactured by TOYOCOLOR Co., Ltd.), 13.9 parts of trimethylolpropane tetraacrylate, 2.5 parts of 4,4'-bis(diethylamino)benzophenone, 2.5 parts of 2-methyl-2-morpholino(4-thiomethylphenyl)propan-1-one, and 0.1 parts of hydroquinone were kneaded at 40° C. in a triple roll mill, and sufficient trimethylolpropane tetraacrylate was then added to the mixture to adjust the ink tack to a value from 9 to 10, thus obtaining an active energy ray-curable lithographic ink (CB). The ink tack was measured using an inkometer manufactured by Toyo Seiki Kogyo Co., Ltd. under conditions including a roller temperature of 30° C. and 400 rpm, and refers to the value measured one minute after printing.

Comparative Example C

Using the same procedure as Example 9 and the blend formulation shown Table 1, a resin (RC) having an acid value of 27 and a Mw of 21,000 was obtained. The proportions of the various structural units in the resin (RC), calculated in accordance with the methods described above, were as shown in Table 1. Subsequently, a varnish (VC) was obtained using the blend formulation shown in Table 2, and an active energy ray-curable lithographic ink (CC) was obtained using the blend formulation shown in Table 3.

TABLE 1

| | Monomer | | Compound | Example 1 Resin 1 (R1) | Example 2 Resin 2 (R2) | Example 3 Resin 3 (R3) | Example 4 Resin 4 (R4) | Example 5 Resin 5 (R5) | Example 6 Resin 6 (R6) |
|---|---|---|---|---|---|---|---|---|---|
| | (B) | | Maleic anhydride | 5 | 7 | 10 | 6 | 9 | 5 |
| | (A) | Gum rosin | Conjugated double bond-containing component | 8 | 12 | 16 | 20 | 24 | 8 |
| | (C) | | Other components | 2 | 3 | 4 | 5 | 6 | 2 |
| | | | Benzoic acid | 16 | 0 | 0 | 41 | 30 | 30 |
| | | | t-butylbenzoic acid | 0 | 30 | 40 | 0 | 0 | 0 |
| | (D) | | Succinic anhydride | 0 | 0 | 2 | 6 | 2 | 0 |
| | | | 1,2,3,6-tetrahydrophthalic anhydride | 41 | 18 | 0 | 0 | 0 | 29 |
| | | | Tetradecylsuccinic anhydride | 0 | 0 | 0 | 0 | 0 | 0 |
| | Aromatic polybasic acid anhydride | | Phthalic anhydride | 0 | 0 | 0 | 0 | 0 | 0 |
| | (E) | | 2,2-dimethyl-1,3-propanediol | 0 | 30 | 28 | 0 | 29 | 0 |
| | | | Pentaerythritol | 28 | 0 | 0 | 22 | 0 | 26 |
| | | | Total of resin raw materials | 100 | 100 | 100 | 100 | 100 | 100 |
| | | | Blend amount of (B) relative to (A) (mol %) | 193 | 180 | 193 | 93 | 116 | 193 |
| | | | Blend amount of (C) relative to (A) (wt %) | 225 | 275 | 275 | 230 | 150 | 400 |
| Catalyst | | | p-toluenesulfonic acid monohydrate | 0.1 | 0.1 | 0.1 | 0.1 | 0.1 | 0.1 |
| Properties | | | Weight average molecular weight (Mw) | 28,000 | 20,000 | 22,000 | 23,000 | 25,000 | 18,000 |
| | | | Acid value | 31 | 25 | 23 | 29 | 33 | 20 |

TABLE 1-continued

| | | | | | | | |
|---|---|---|---|---|---|---|---|
| Proportions, amounts of structural units (by weight) | Amount of structural unit (ab) | 10.6 | 15.9 | 21.2 | 24.5 | 31.8 | 10.6 |
| | Proportion of structural unit (c) | 169.9 | 207.7 | 207.7 | 187.7 | 113.3 | 302.1 |
| | Residual amount of (B) | 2.4 | 3.1 | 4.8 | 0.0 | 1.2 | 2.4 |
| | Proportion of structural unit (d) | 60.3 | 30.2 | 9.5 | 7.7 | 4.5 | 42.4 |
| Proportions, amounts of structural units (by moles) | Amount of structural unit (ab) | 0.03 | 0.04 | 0.05 | 0.06 | 0.08 | 0.03 |
| | Amount of structural unit (c) | 0.14 | 0.18 | 0.24 | 0.35 | 0.27 | 0.25 |
| | Proportion of structural unit (c) | 520.3 | 449.5 | 449.5 | 575.7 | 334.6 | 953.8 |
| | Residual amount of (B) | 0.02 | 0.03 | 0.05 | 0.00 | 0.01 | 0.02 |
| | Blend amount of (D) | 0.27 | 0.12 | 0.02 | 0.06 | 0.02 | 0.19 |
| | Amount of all structural units other than structural unit (e) | 0.46 | 0.37 | 0.36 | 0.48 | 0.38 | 0.49 |
| | Proportion of structural unit (d) | 64.2 | 40.8 | 19.2 | 12.5 | 8.6 | 43.6 |

| | | | Example | | | Comparative Example | |
|---|---|---|---|---|---|---|---|
| | | | 7 Resin 7 (R7) | 8 Resin 8 (R8) | 9 Resin 9 (R9) | A Resin A (RA) | B Resin B (RB) | C Resin C (RC) |
| Monomer | Compound | | | | | | | |
| (B) | Maleic anhydride | | 12 | 7 | 20 | 2 | 6 | 7 |
| (A) Gum rosin | Conjugated double bond-containing component | | 24 | 12 | 12 | 12 | 20 | 12 |
| (C) | Other components | | 6 | 3 | 3 | 3 | 5 | 3 |
| | Benzoic acid | | 20 | 0 | 0 | 0 | 41 | 0 |
| | t-butylbenzoic acid | | 0 | 33 | 30 | 30 | 0 | 30 |
| (D) | Succinic anhydride | | 12 | 0 | 0 | 19 | 6 | 0 |
| | 1,2,3,6-tetrahydrophthalic anhydride | | 0 | 0 | 9 | 0 | 0 | 0 |
| | Tetradecylsuccinic anhydride | | 0 | 19 | 0 | 0 | 0 | 0 |
| Aromatic polybasic acid anhydride | Phthalic anhydride | | 0 | 0 | 0 | 0 | 0 | 18 |
| (E) | 2,2-dimethyl-1,3-propanediol | | 0 | 26 | 0 | 34 | 0 | 30 |
| | Pentaerythritol | | 26 | 0 | 26 | 0 | 22 | 0 |
| | Total of resin raw materials | | 100 | 100 | 100 | 100 | 100 | 100 |
| | Blend amount of (B) relative to (A) (mol %) | | 154 | 180 | 514 | 51 | 93 | 180 |
| | Blend amount of (C) relative to (A) (wt %) | | 108 | 300 | 275 | 275 | 230 | 275 |
| Catalyst | p-toluenesulfonic acid monohydrate | | 0.1 | 0.1 | 0.1 | 0.1 | 0.1 | 0.1 |
| Properties | Weight average molecular weight (Mw) | | 29,000 | 23,000 | 30,000 | 25,000 | 25,000 | 21,000 |
| | Acid value | | 36 | 33 | 22 | 25 | 37 | 27 |
| Proportions, amounts of structural units (by weight) | Amount of structural unit (ab) | | 31.8 | 15.9 | 15.9 | 8.2 | 12.3 | 15.9 |
| | Proportion of structural unit (c) | | 81.8 | 226.6 | 207.7 | 404.0 | 375.4 | 207.7 |
| | Residual amount of (B) | | 4.2 | 3.1 | 16.1 | 0.0 | 3.0 | 3.1 |
| | Proportion of structural unit (d) | | 21.9 | 29.9 | 33.9 | 28.8 | 11.5 | 30.2 |
| Proportions, amounts of structural units (by moles) | Amount of structural unit (ab) | | 0.08 | 0.04 | 0.04 | 0.02 | 0.03 | 0.04 |
| | Amount of structural unit (c) | | 0.18 | 0.20 | 0.18 | 0.18 | 0.35 | 0.18 |
| | Proportion of structural unit (c) | | 231.4 | 492.0 | 449.5 | 874.4 | 1151.4 | 449.5 |
| | Residual amount of (B) | | 0.04 | 0.03 | 0.16 | 0.00 | 0.03 | 0.03 |
| | Blend amount of (D) | | 0.12 | 0.06 | 0.06 | 0.19 | 0.06 | 0.12 |
| | Amount of all structural units other than structural unit (e) | | 0.43 | 0.33 | 0.44 | 0.41 | 0.51 | 0.37 |
| | Proportion of structural unit (d) | | 38.3 | 29.0 | 50.6 | 46.5 | 17.8 | 41.3 |

Notes:

In Table 1, the blend amounts of the various monomers used when producing the rosin-modified resins are all recorded as solid fraction weights.

The proportions and amounts of the structural units shown in Table 1 are values calculated on a weight basis and a molar basis respectively, obtained by analyzing the reaction solution by gas chromatography-mass spectrometry in accordance with the methods described above. A summary is shown below.

The amount of the structural unit (ab) corresponds with the amount of the compound obtained as a result of the Diels-Alder reaction between the component (A) and the component (B), measured and calculated using the method described above.

The proportion of the structural unit (c) is the proportion calculated based on the amount of the structural unit (ab).

The residual amount of the component (B) is the residual amount of the component (B) not consumed by the Diels-Alder reaction.

The blend amount of the component (D) is the amount of the aliphatic polybasic acid anhydride (D) added following the Diels-Alder reaction. In the examples, in those cases where the residual amount of the component (B) is greater than 0, the amount of the structural unit (d) is the value obtained by adding the above residual amount of the component (B) to the blend amount of the component (D).

The amount of all the structural units other than the structural unit (e) is the total amount of all the components except the component (E) consumed in the esterification reaction.

The proportion of the structural unit (d) is the proportion calculated based on the above amount of all the structural units other than the structural unit (e).

TABLE 2

|  |  | Example | | | | | | |
|---|---|---|---|---|---|---|---|---|
|  |  | 1 | 2 | 3 | 4 | 5 | 6 | 7 |
|  | Varnish | Varnish 1 (V1) | Varnish 2 (V2) | Varnish 3 (V3) | Varnish 4 (V4) | Varnish 5 (V5) | Varnish 6 (V6) | Varnish 7 (V7) |
|  | Rosin-modified resin used | Resin 1 (R1) | Resin 2 (R2) | Resin 3 (R3) | Resin 4 (R4) | Resin 5 (R5) | Resin 6 (R6) | Resin 7 (R7) |
| Varnish components | Rosin-modified resin | 38.0 | 37.0 | 33.0 | 34.0 | 34.0 | 37.0 | 34.0 |
|  | Dipentaerythritol hexaacrylate | 61.9 | 62.9 | 66.9 | 65.9 | 65.9 | 62.9 | 65.9 |
|  | Hydroquinone | 0.1 | 0.1 | 0.1 | 0.1 | 0.1 | 0.1 | 0.1 |
|  | Total | 100 | 100 | 100 | 100 | 100 | 100 | 100 |

|  |  | Example | | Comparative Example | | |
|---|---|---|---|---|---|---|
|  |  | 8 | 9 | A | B | C |
|  | Varnish | Varnish 8 (V8) | Varnish 9 (V9) | Varnish A (VA) | Varnish B (VB) | Varnish C (VC) |
|  | Rosin-modified resin used | Resin 8 (R8) | Resin B (RB) | Resin A (RA) | Resin B (RB) | Resin C (RC) |
| Varnish components | Rosin-modified resin | 32.0 | 33.0 | 35.0 | 34.0 | 37.0 |
|  | Dipentaerythritol hexaacrylate | 67.9 | 66.9 | 64.9 | 65.9 | 62.9 |
|  | Hydroquinone | 0.1 | 0.1 | 0.1 | 0.1 | 0.1 |
|  | Total | 100 | 100 | 100 | 100 | 100 |

TABLE 3

|  |  | Example | | | | | | |
|---|---|---|---|---|---|---|---|---|
|  |  | 1 | 2 | 3 | 4 | 5 | 6 | 7 |
|  | Ink | Ink 1 (C1) | Ink 2 (C2) | Ink 3 (C3) | Ink 4 (C4) | Ink 5 (C5) | Ink 6 (C6) | Ink 7 (C7) |
|  | Varnish used | Varnish 1 (V1) | Varnish 2 (V2) | Varnish 3 (V3) | Varnish 4 (V4) | Varnish 5 (V5) | Varnish 6 (V6) | Varnish 7 (V7) |
| Ink components | Varnish | 62 | 61 | 63 | 63 | 62 | 60 | 62 |
|  | LIONOL BLUE FG-7330 | 20 | 20 | 20 | 20 | 20 | 20 | 20 |
|  | Trimethylolpropane tetraacrylate | 12.9 | 13.9 | 11.9 | 11.9 | 12.9 | 14.9 | 12.9 |
|  | 4,4'-bis(diethylamino)benzophenone | 2.5 | 2.5 | 2.5 | 2.5 | 2.5 | 2.5 | 2.5 |
|  | 2-methyl-2-morpholino-(4-thiomethylphenyl)propan-1-one | 2.5 | 2.5 | 2.5 | 2.5 | 2.5 | 2.5 | 2.5 |
|  | Hydroquinone | 0.1 | 0.1 | 0.1 | 0.1 | 0.1 | 0.1 | 0.1 |
|  | Total | 100 | 100 | 100 | 100 | 100 | 100 | 100 |

|  |  | Example | | Comparative Example | | |
|---|---|---|---|---|---|---|
|  |  | 8 | 9 | A | B | C |
|  | Ink | Ink 8 (C8) | Ink 9 (C9) | Ink A (CA) | Ink B (CB) | Ink C (CC) |
|  | Varnish used | Varnish 8 (V8) | Varnish 9 (V9) | Varnish A (VA) | Varnish B (VB) | Varnish C (VC) |
| Ink components | Varnish | 61 | 61 | 63 | 61 | 61 |
|  | LIONOL BLUE FG-7330 | 20 | 20 | 20 | 20 | 20 |
|  | Trimethylolpropane tetraacrylate | 13.9 | 13.9 | 11.9 | 13.9 | 13.9 |
|  | 4,4'-bis(diethylamino)benzophenone | 2.5 | 2.5 | 2.5 | 2.5 | 2.5 |
|  | 2-methyl-2-morpholino-(4-thiomethylphenyl)propan-1-one | 2.5 | 2.5 | 2.5 | 2.5 | 2.5 |
|  | Hydroquinone | 0.1 | 0.1 | 0.1 | 0.1 | 0.1 |
|  | Total | 100 | 100 | 100 | 100 | 100 |

2. Evaluation of Active Energy Ray-Curable Lithographic Inks

The active energy ray-curable lithographic inks produced in the examples and comparative examples were evaluated for printed coating film applicability and printability in accordance with the methods described below.

<Evaluation of Printed Coating Film Applicability>

Using an RI Tester (a simple ink transfer device manufactured by Akira Seisakusho Co., Ltd.), each of the active energy ray-curable lithographic inks obtained in Examples 1 to 9 and Comparative Examples A to C was printed onto Maricoat paper (a coated cardboard manufactured by Hokuetsu Corporation) at a coating amount of 1 g/m², and the applied ink was then irradiated with ultraviolet rays at 60 m/min using a single 120 W/cm air-cooled metal halide lamp (manufactured by Toshiba Corporation).

The curability, solvent resistance, abrasion resistance and gloss value of the printed product obtained following ultraviolet irradiation were evaluated in the manner described below. The evaluation results are shown in Table 4.

(Curability)

The curability was evaluated on a 4-grade scale against the criteria described below, by visually inspecting the state of the printed surface of the printed product upon rubbing with a cotton cloth. An evaluation of 3 or higher represents a usable level.

4: no change to the printed surface.

3: scratches observed on part of the printed surface, but no detachment observed.

2: detachment observed on part (less than 50%) of the printed surface.

1: detachment observed on part (at least 50%) or all of the printed surface.

(Solvent Resistance)

The solvent resistance was evaluated on a 4-grade scale against the criteria described below, by rubbing a cotton swab that had been dipped in MEK (methyl ethyl ketone) 30 times across the printed surface, and then visually inspecting the state of the printed surface. An evaluation of 3 or higher represents a usable level.

4: no change to the printed surface.

3: dissolution observed on part of the printed surface, but no detachment observed.

2: detachment observed on part (less than 50%) of the printed surface.

1: detachment observed on part (at least 50%) or all of the printed surface.

(Abrasion Resistance)

The abrasion resistance was evaluated by testing the printed surface (coating film) of the printed product in accordance with JIS K5701-1. Specifically, using a Gakushin-type rubbing fastness tester (manufactured by Tester Sangyo Co., Ltd.), 500 back and forth rubbing repetitions across the coating film surface were performed using a high-quality paper as the rubbing paper with a 500 g weight applied. The rubbed surface (coating film surface) was then inspected visually for change, and the abrasion resistance was evaluated on a 4-grade scale against the criteria described below. An evaluation of 3 or higher represents a usable level.

4: no change in the rubbed surface

3: scratches observed on part of the rubbed surface, but no detachment observed.

2: detachment observed on part (less than 50%) of the rubbed surface.

1: detachment observed on part (at least 50%) or all of the rubbed surface.

(Glossiness)

Using a Prufbau printability tester, each ink was printed onto Pearl Coat paper manufactured by Mitsubishi Paper Mills Ltd. at a uniform density, thus preparing a test sample. Subsequently, a Gloss Meter model GM-26 (manufactured by Murakami Color Research Laboratory Co., Ltd.) was used to measure the 60° gloss value of the test sample. Based on the obtained gloss value, the glossiness was evaluated on a 4-grade scale against the criteria described below. A higher numerical gloss value indicates superior gloss. An evaluation of 2 or higher represents a usable level, but an evaluation of 3 or higher is preferred.

4: gloss value of 60 or higher.

3: gloss value of at least 50 but less than 60.

2: gloss value of at least 40 but less than 50.

1: gloss value of less than 40.

Further, using an RI Tester (a simple ink transfer device manufactured by Akira Seisakusho Co., Ltd.), each of the active energy ray-curable lithographic inks obtained in Examples 1 to 9 and Comparative Examples A to C was printed onto a PP film at a coating amount of 1 $g/m^2$, and the applied ink was then irradiated with ultraviolet rays at 60 m/min using a single 120 W/cm air-cooled metal halide lamp (manufactured by Toshiba Corporation) to obtain a printed product. Printed products were also obtained using the same method as above, but using a PE film instead of the PP film.

The adhesiveness of each printed product following ultraviolet irradiation was evaluated in the manner described below. The evaluation results are shown in Table 4.

(Adhesiveness)

For each of the printed products on PP film and PE film obtained in the manner described above, the adhesiveness was evaluated by performing a cellophane peel test. The surface of the printed product following the test was inspected visually, and the adhesiveness was evaluated on a 4-grade scale against the criteria described below. An evaluation of 3 or higher represents a usable level.

4: no change in the printed surface

3: peeling observed on part (less than 25%) of the printed surface.

2: peeling observed on part (at least 25% but less than 50%) of the printed surface.

1: peeling observed on part (at least 50%) or all of the printed surface.

<Evaluation of Printability>

Using each of the active energy ray-curable lithographic inks obtained in Examples 1 to 9 and Comparative Examples A to C, a printing test was performed by printing 20,000 copies using the ink. The printing test was conducted by using a LITHRONE 226 (a sheet-fed printing press, manufactured by Komori Corporation) to print to Mitsubishi special double-sided art paper having a weight of 90 Kg/ream (manufactured by Mitsubishi Paper Mills Ltd.) under conditions including a printing speed of 10,000 copies/hour.

Furthermore, in the printing test, tap water containing 1.5% of Astro Mark III Clear (manufactured by Toyo Ink SC Holdings Co., Ltd.) and 3% of isopropyl alcohol was used as the dampening water. In order to enable comparison of the printed state near the boundaries of the range of conditions under which normal printing can be performed, printing was performed at a water dial value 2% higher than the water tolerance lower limit. Here, the "water tolerance lower limit" means the minimum dampening water supply volume at which normal printing can be performed, and the "water dial" means the dial provided on the printing press for adjusting the supply volume of dampening water.

The printed products obtained in the printing test were compared for the state of the solid printed areas and the level of scumming, but no marked differences were observed between the printed products prepared using the inks of Examples 1 to 9 and Comparative Examples A to C.

Furthermore, in the printing test described above, based on the number of waste sheets generated at the start of printing until density fluctuations stabilized, the initial density stability was evaluated on a 4-grade scale against the criteria described below. An evaluation of 2 or higher represents a usable level, but an evaluation of 3 or higher is preferred. The evaluation results are shown in Table 4.

(Evaluation Criteria for Initial Density Stability)
4: number of waste sheets of 200 or fewer.
3: number of waste sheets of at least 201 but not more than 500.
2: number of waste sheets of at least 501 but not more than 800.
1: number of waste sheets of 801 or more.

Among Examples 1 to 9, in terms of the solvent resistance and the abrasion resistance, the inks of Examples 1, 5, 7 and 9, in which the rosin-modified resin had a large molecular weight, exhibited particularly favorable results. It is thought that this is because increasing the molecular weight of the rosin-modified resin used as the binder resin enables the coating film strength to be increased.

TABLE 4

|  | Example | | | | | | | | | Comparative Example | | |
|---|---|---|---|---|---|---|---|---|---|---|---|---|
|  | 1 | 2 | 3 | 4 | 5 | 6 | 7 | 8 | 9 | A | B | C |
|  | Ink 1 (C1) | Ink 2 (C2) | Ink 3 (C3) | Ink 4 (C4) | Ink 5 (C5) | Ink 6 (C6) | Ink 7 (C7) | Ink 8 (C8) | Ink 9 (C9) | Ink A (CA) | Ink B (CB) | Ink C (CC) |
| Curability | 4 | 4 | 4 | 3 | 4 | 4 | 4 | 4 | 4 | 2 | 2 | 4 |
| MEK resistance | 4 | 3 | 3 | 3 | 4 | 3 | 4 | 3 | 4 | 1 | 1 | 3 |
| Abrasion resistance | 4 | 3 | 4 | 3 | 4 | 3 | 4 | 3 | 4 | 2 | 2 | 3 |
| Gloss Value | 4 | 4 | 4 | 3 | 4 | 3 | 3 | 3 | 2 | 3 | 3 | 4 |
| Adhesiveness (PP film) | 3 | 3 | 4 | 4 | 4 | 3 | 4 | 4 | 3 | 4 | 4 | 1 |
| Adhesiveness (PE film) | 3 | 3 | 4 | 4 | 4 | 3 | 4 | 4 | 3 | 2 | 2 | 1 |
| Initial density stability | 4 | 4 | 4 | 3 | 4 | 3 | 3 | 3 | 2 | 2 | 3 | 4 |

As shown in Table 4, the inks of Examples 1 to 9 that correspond with embodiments of the present invention exhibited usable levels for all of the evaluations, including curability, solvent resistance, abrasion resistance, glossiness, adhesiveness and initial density stability, and it was evident that the inks were able to provide a combination of excellent printed coating film applicability and excellent printability. In contrast, it was evident that achieving a combination of printed coating film applicability and printability was difficult using the inks of Comparative Examples A to C.

More specifically, in embodiments in which the weight ratio between the structural unit (ab) and the structural unit (c) within the rosin-modified resin used as the binder resin was within a range from 100:80 to 100:350, as seen in the inks of Examples 1 to 9, favorable results were obtained for the printed coating film properties such as the curability.

On the other hand, in the inks of Comparative Examples A and B, the evaluation results showed a particularly marked deterioration in the solvent resistance. It is thought that this is because in the inks of Comparative Examples A and B, the weight ratio between the structural unit (ab) and the structural unit (c) within the rosin-modified resin used as the binder resin fell outside the above range, meaning an appropriate molecular weight distribution could not be obtained for the rosin-modified resin. In particular, the Comparative Example B used a resin that was obtained by adding the conjugated rosin acid (A) and the α,β-unsaturated carboxylic acid anhydride (B) in the latter stages of the reaction process during the production of the rosin-modified resin. It is thought that in a resin obtained in this type of embodiment, the Diels-Alder addition reaction is unable to proceed satisfactorily, meaning residual conjugated double bonds from the rosin acid are retained, resulting in curing inhibition.

Further, in the case of Comparative Example C, because the rosin-modified resin used as the binder resin in the ink had an aforementioned weight ratio that satisfied the above range, excellent curability was obtained, but the results revealed a marked deterioration in the adhesiveness. It is thought that this is because the rosin-modified resin did not have the structural unit (d) derived from the aliphatic polybasic acid anhydride (D), but rather had a structural unit derived from phthalic anhydride, which has a rigid aromatic structure.

Further, differences were also observed for the gloss values and the initial density stability, with particularly favorable results obtained for Examples 1 to 3 and Example 5. It is thought that this is because these rosin-modified resins were produced using appropriate blend amounts of the raw material monomers. Specifically, the above embodiments use rosin-modified resins produced by adjusting the amounts of the monomers in the production of the rosin-modified resin so that relative to the amount of the conjugated rosin acid (A), the blend amount of the α,β-unsaturated carboxylic acid or acid anhydride thereof (B) is within a range from 100 mol % to 200 mol %, and the blend amount of the organic monobasic acid (C) is within a range from 150% by weight to 300% by weight. It is thought that by using this type of rosin-modified resin, favorable fluidity can be maintained for the active energy ray-curable lithographic ink.

Further, in terms of adhesiveness, favorable results were obtained in Examples 1 to 9 for both the (PP) film substrate and the (PE) film substrate. In particular, Examples 3, 4, 5, 7 and 8 yielded extremely favorable results, with an evaluation of "4" for both substrates. It is thought that this is because succinic anhydride and tetradecylsuccinic anhydride, which have comparatively flexible structures, were used as the aliphatic polybasic acid anhydride (D).

In contrast, as mentioned above, the ink of Comparative Example C did not use the aliphatic polybasic acid anhydride (D), but rather used phthalic anhydride, which has a rigid aromatic structure, and therefore the adhesiveness deteriorated markedly. Further, although the inks of Comparative Examples A and B exhibited a favorable adhesiveness result for the PP film, the adhesiveness to the PE film did not reach a usable level. It is thought that this is because in the inks of Comparative Examples A and B, the amount of the structural unit (c) that bonds to the carboxyl group of the structural unit (ab) is large, and therefore manifestation of adhesiveness to the PE film via the structural unit (ab) is inhibited, resulting in a deterioration in the adhesiveness.

The invention claimed is:
1. A rosin-modified resin, having:
a structural unit (ab) derived from a compound obtained by addition of an α,β-unsaturated carboxylic acid or acid anhydride thereof (B) to a conjugated rosin acid

(A), a structural unit (c) derived from an organic monobasic acid (C) excluding the conjugated rosin acid (A), a structural unit (d) derived from an aliphatic polybasic acid anhydride (D), and a structural unit (e) derived from a polyol (E), wherein
a weight ratio between the structural unit (ab) and the structural unit (c) is within a range from 100:110 to 100:350.

2. The rosin-modified resin according to claim 1, wherein a number of carbon atoms in the structural unit (d) is not more than 16, excluding a carbonyl carbon.

3. The rosin-modified resin according to claim 1, wherein a proportion of the structural unit (d), based on a total number of moles of all structural units that constitute the rosin-modified resin except for the structural unit (e), is within a range from 5.0 mol % to 65.0 mol %.

4. A varnish for an active energy ray-curable lithographic ink, the varnish comprising the rosin-modified resin according to claim 1, and an active energy ray-curable compound.

5. An active energy ray-curable lithographic ink comprising the rosin-modified resin according to claim 1, an active energy ray-curable compound, and a pigment.

6. A printed product having a substrate, and a printed layer being formed on the substrate using the active energy ray-curable lithographic ink according to claim 5.

7. A rosin-modified resin obtained by reacting a compound obtained by addition of an α,β-unsaturated carboxylic acid or acid anhydride thereof (B) to a conjugated rosin acid (A), an organic monobasic acid (C) excluding the conjugated rosin acid (A) and an aliphatic polybasic acid anhydride (D), with a polyol (E), wherein
a blend amount of the α,β-unsaturated carboxylic acid or acid anhydride thereof (B), relative to the conjugated rosin acid (A), is within a range from 80 mol % to 200 mol %, and
a blend amount of the organic monobasic acid (C), relative to the conjugated rosin acid (A), is within a range from 150 to 400% by weight.

8. The rosin-modified resin according to claim 7, wherein a blend amount of the α,β-unsaturated carboxylic acid or acid anhydride thereof (B), relative to the conjugated rosin acid (A), is within a range from 100 mol % to 200 mol %.

9. The rosin-modified resin according to claim 7, wherein a blend amount of the organic monobasic acid (C), relative to the conjugated rosin acid (A), is within a range from 150% by weight to 300% by weight.

10. The rosin-modified resin according to claim 7, wherein a number of carbon atoms in the aliphatic polybasic acid anhydride (D) is not more than 16, excluding a carbonyl carbon.

11. A method for producing a rosin-modified resin, comprising
a step of conducting a reaction of adding an α,β-unsaturated carboxylic acid or acid anhydride thereof (B) to a conjugated rosin acid (A), and
a step of conducting an esterification reaction of a compound obtained in the above step, an organic monobasic acid (C) excluding the conjugated rosin acid (A), and an aliphatic polybasic acid anhydride (D), with a polyol (E), wherein
a blend amount of the α,β-unsaturated carboxylic acid or acid anhydride thereof (B), relative to the conjugated rosin acid (A), is within a range from 80 mol % to 200 mol %, and
a blend amount of the organic monobasic acid (C), relative to the conjugated rosin acid (A), is within a range from 150% by weight to 400% by weight.

* * * * *